US012696050B2

(12) United States Patent (10) Patent No.: US 12,696,050 B2

Gilson et al. (45) Date of Patent: *Jul. 28, 2026

(54) METHODS AND SYSTEMS FOR LOCALIZED GEOLOCATION

(71) Applicant: Comcast Cable Communications, LLC, Philadelphia, PA (US)

(72) Inventors: Ross Gilson, Philadelphia, PA (US); Brett Dietsch, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 93 days.

This patent is subject to a terminal disclaimer.

(21) Appl. No.: 18/733,209

(22) Filed: Jun. 4, 2024

(65) Prior Publication Data

US 2024/0406673 A1 Dec. 5, 2024

Related U.S. Application Data

(63) Continuation of application No. 17/559,742, filed on Dec. 22, 2021, now Pat. No. 12,047,836, which is a continuation of application No. 16/820,260, filed on Mar. 16, 2020, now Pat. No. 11,240,632.

(60) Provisional application No. 62/819,240, filed on Mar. 15, 2019.

(51) Int. Cl.
*H04W 4/02* (2018.01)
*H04W 4/029* (2018.01)

(52) U.S. Cl.
CPC .......... *H04W 4/023* (2013.01); *H04W 4/029* (2018.02)

(58) Field of Classification Search
CPC ....... H04W 4/02; H04W 4/023; H04W 4/029; H04W 4/021; H04W 4/025; H04B 17/27; H04B 17/318
See application file for complete search history.

(56) References Cited

U.S. PATENT DOCUMENTS

| | | | |
|---|---|---|---|
| 8,385,943 B1 | 2/2013 | Han et al. | |
| 9,445,241 B2 | 9/2016 | Chen et al. | |
| 9,960,933 B2 | 5/2018 | Ghosh et al. | |
| 10,009,715 B2 | 6/2018 | Sponza et al. | |
| 10,270,642 B2 | 4/2019 | Zhang et al. | |
| 10,499,194 B1 | 12/2019 | Tyagi et al. | |
| 11,240,632 B2 | 2/2022 | Gilson et al. | |
| 11,557,291 B2 | 1/2023 | Ryu et al. | |
| 2005/0243936 A1* | 11/2005 | Agrawala ............. | H04W 64/00 |
| | | | 375/259 |
| 2008/0008117 A1 | 1/2008 | Alizadeh-Shabdiz | |

(Continued)

*Primary Examiner* — Mong-Thuy T Tran

(74) *Attorney, Agent, or Firm* — Ballard Spahr LLP

(57) ABSTRACT

To conserve energy associated with bi-directional communications with network devices (e.g., access point, router, long-range (LoRa) access point, edge device, etc.), and to limit data/information processing resources associated with such bi-directional communications, a user device (e.g., a data collection device, an Internet of Things (IoT) device, an end device, a low-power device, a sensor, etc.) may determine its location (e.g., geolocation, etc.). The user device may use mapping information that identifies each network device within a geographical area to identify locations of network devices within a communication range of the user device. The user device may determine its own location based on the locations of the network devices within the communication range.

20 Claims, 13 Drawing Sheets

(56)        References Cited

U.S. PATENT DOCUMENTS

| | | | |
|---|---|---|---|
| 2008/0064404 A1 | 3/2008 | Zhang et al. | |
| 2011/0039576 A1* | 2/2011 | Prakash | G01S 5/0236 |
| | | | 455/456.1 |
| 2011/0260922 A1* | 10/2011 | Zhang | G01S 5/02525 |
| | | | 342/451 |
| 2012/0309420 A1 | 12/2012 | Morgan et al. | |
| 2013/0217418 A1 | 8/2013 | Maurin et al. | |
| 2014/0156180 A1 | 6/2014 | Marti et al. | |
| 2014/0179352 A1 | 6/2014 | V.M et al. | |
| 2014/0187268 A1 | 7/2014 | Browne et al. | |
| 2014/0235266 A1 | 8/2014 | Edge et al. | |
| 2014/0342754 A1 | 11/2014 | Liu et al. | |
| 2015/0024782 A1 | 1/2015 | Edge | |
| 2015/0223189 A1 | 8/2015 | Le Grand et al. | |
| 2015/0237164 A1 | 8/2015 | Mohammad Mirzaei et al. | |
| 2016/0014570 A1 | 1/2016 | Wuoti et al. | |
| 2016/0066252 A1 | 3/2016 | Parron et al. | |
| 2016/0198292 A1* | 7/2016 | Sponza | H04W 64/00 |
| | | | 455/456.1 |
| 2016/0291124 A1 | 10/2016 | Bauer | |
| 2017/0195136 A1 | 7/2017 | Ghosh et al. | |
| 2017/0206571 A1 | 7/2017 | Dhawan et al. | |
| 2017/0257750 A1 | 9/2017 | Gunasekara et al. | |
| 2018/0014351 A1 | 1/2018 | Coutinho et al. | |
| 2018/0020363 A1* | 1/2018 | Faxér | H04B 7/024 |
| 2018/0266826 A1 | 9/2018 | Wang et al. | |
| 2018/0288386 A1* | 10/2018 | Lazarow | H04N 13/366 |
| 2018/0302751 A1 | 10/2018 | Coutinho et al. | |
| 2019/0320409 A1 | 10/2019 | Dvorecki et al. | |
| 2020/0077257 A1* | 3/2020 | Ekambaram | H04B 17/318 |
| 2020/0119820 A1 | 4/2020 | Kurras et al. | |
| 2020/0288284 A1 | 9/2020 | Klein | |
| 2020/0288310 A1* | 9/2020 | Ekambaram | G06F 21/57 |
| 2021/0090567 A1 | 3/2021 | Tukka et al. | |

* cited by examiner

= adequate communication / signaling

= weak communication / signaling

600

610
RECEIVE MAPPING INFORMATION

620
DETERMINE A PLURALITY OF EXCLUDED NETWORK DEVICES AND A PLURALITY OF INCLUDED NETWORK DEVICES

630
REMOVE THE PLURALITY OF EXCLUDED NETWORK DEVICES FROM THE MAPPING INFORMATION

640
RECEIVE NETWORK INFORMATION FROM THE PLURALITY OF INCLUDED NETWORK DEVICES

650
DETERMINE A LOCATION BASED ON THE NETWORK INFORMATION

FIG. 7

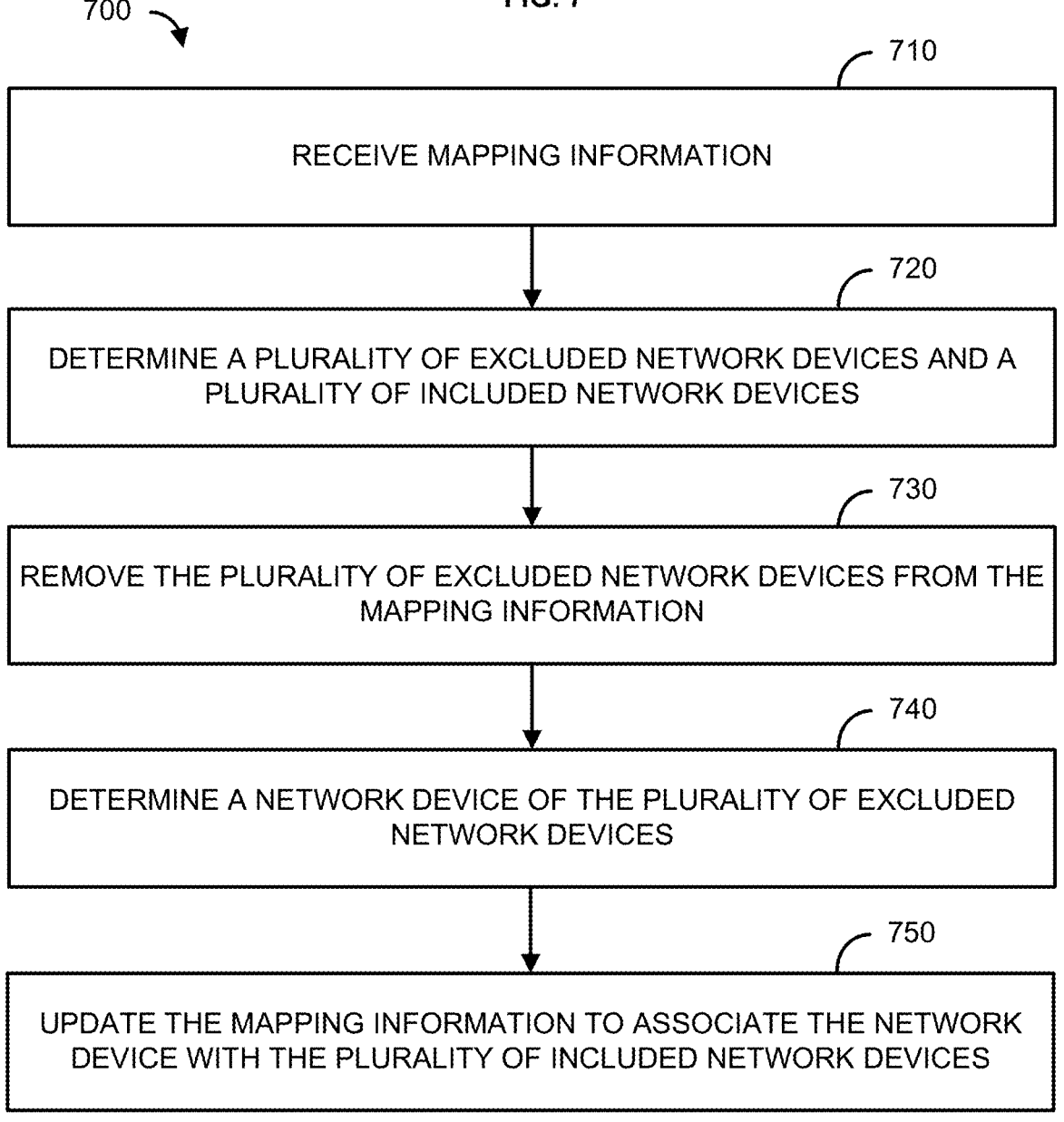

700

710

RECEIVE MAPPING INFORMATION

720

DETERMINE A PLURALITY OF EXCLUDED NETWORK DEVICES AND A PLURALITY OF INCLUDED NETWORK DEVICES

730

REMOVE THE PLURALITY OF EXCLUDED NETWORK DEVICES FROM THE MAPPING INFORMATION

740

DETERMINE A NETWORK DEVICE OF THE PLURALITY OF EXCLUDED NETWORK DEVICES

750

UPDATE THE MAPPING INFORMATION TO ASSOCIATE THE NETWORK DEVICE WITH THE PLURALITY OF INCLUDED NETWORK DEVICES

800

810

DETERMINE DEVICE LOCATION INFORMATION

820

DETERMINE A DATA COLLECTION DEVICE

830

DETERMINE MAPPING INFORMATION ASSOCIATED WITH THE DATA COLLECTION DEVICE

840

SEND THE MAPPING INFORMATION TO THE DATA COLLECTION DEVICE

900

910

RECEIVE MAPPING INFORMATION

920

DETERMINE ONE OR MORE NETWORK DEVICES WITHIN A COMMUNICATION RANGE AND ONE OR MORE NETWORK DEVICES OUTSIDE OF THE COMMUNICATION RANGE

930

REMOVE THE ONE OR MORE NETWORK DEVICES OUTSIDE OF THE COMMUNICATION RANGE FROM THE MAPPING INFORMATION

940

COMMUNICATE WITH THE ONE OR MORE NETWORK DEVICES WITHIN THE COMMUNICATION RANGE

1000

1010

RECEIVE MAPPING INFORMATION

1020

DETERMINE ONE OR MORE NETWORK DEVICES WITHIN A PROXIMITY

1030

UPDATE THE MAPPING INFORMATION TO EXCLUDE ALL NETWORK DEVICES EXCEPT THE ONE OR MORE NETWORK DEVICES

1040

RECEIVE NETWORK INFORMATION ASSOCIATED WITH THE ONE OR MORE NETWORK DEVICES

1050

DETERMINE A LOCATION

METHODS AND SYSTEMS FOR LOCALIZED GEOLOCATION

CROSS REFERENCE TO RELATED PATENT APPLICATIONS

This application claims priority under 35 U.S.C. § 120 to, and is a continuation of, U.S. patent application Ser. No. 17/559,742, filed Dec. 22, 2021, which claims priority under 35 U.S.C. § 120 to, and is a continuation of, U.S. patent application Ser. No. 16/820,260, filed Mar. 16, 2020, now U.S. Pat. No. 11,240,632, which claims priority to U.S. Provisional Patent Application No. 62/819,240 filed Mar. 15, 2019, the entire contents of each of which are hereby incorporated herein by reference in their entirety for all purposes.

BACKGROUND

Network devices, such as Internet of Things (IoT) devices, determine their location using various techniques, including latitude and longitude coordinates provided by a global positioning system (GPS) device, time difference of arrival (TDOA) measurements, or detecting nearby Wi-Fi networks. GPS techniques require network devices to be equipped with sensors that consume excessive amounts of energy, and may be limited to outdoor operation. TDOA measurements require a dense gateway deployment, costly gateway configurations, and a highly accurate clock synchronization technique. Detecting Wi-Fi networks requires Wi-Fi beacons to first be intercepted, then to be sent upstream to a geolocation solver configured to determine a location, routinely by GPS techniques and TDOA measurements.

SUMMARY

It is to be understood that both the following general description and the following detailed description are exemplary and explanatory only and are not restrictive. Methods and systems for localized geolocation are described.

A user device (e.g., a data collection device, an Internet of Things (IoT) device, an end device, a low-power device, a sensor, etc.) may use mapping information to determine a location (e.g., geolocation, etc.) of the user device. The mapping information may have a location of each of a plurality of network devices (e.g., access points, routers, long-range (LoRa) access points, edge devices, etc.) within a geographical area.

The mapping information may be sent (e.g., provided, distributed, etc.) to the user device. The user device may receive the mapping information from a gateway device (e.g., a long-range (LoRa) device, a computing device, a cloud device, etc.). The user device may receive the mapping information from the gateway device based on a periodic broadcast/transmission by the gateway device. The mapping information may be localized in relation to the user device. The user device may use the mapping information to determine one or more network devices within a range (e.g., transmission range, broadcast range, proximity, etc.) of the user device. The user device may update the mapping information to remove one or more network devices from the mapping information that are not within the range. The user device may receive network information from the one or more network devices within range of the user device. The user device may frequently use the network information to accurately and reliably determine a location of the user device (e.g., geolocation, etc.), and also decrease the amount of time required to determine the location of the user device. The user device may conserve energy, airtime capacity, and data/information processing resources by receiving and using the mapping information for geolocation without transmitting information/data, such as to a network device and/or a gateway device (e.g., a long-range (LoRa) device, a computing device, cloud device, etc.).

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, together with the description, serve to explain the principles of the methods and systems:

FIG. 1 shows a system for localized geolocation;

FIG. 7 shows a flowchart of a method for localized geolocation;

DETAILED DESCRIPTION

Figure 2:
FIG. 2 shows a system for localized geolocation.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to MPEG2, MPEG, MPEG4 UHD, HDR, 4 k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. Content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

Phrases used herein, such as "accessing" content, "providing" content, "viewing" content, "listening" to content, "rendering" content, "playing" content, "consuming" content, and the like are considered interchangeable, related, and/or the same. The particular term utilized may be dependent on the context in which it is used. Accessing video may also be referred to as viewing or playing the video. Accessing audio may also be referred to as listening to or playing the audio.

This detailed description may refer to a given entity performing some action. It should be understood that this language may in some cases mean that a system (e.g., a computer) owned and/or controlled by the given entity is actually performing the action.

A user device (e.g., a data collection device, an Internet of Things (IoT) device, an end device, a low-power device, a sensor, etc.) may need to identify its own location (e.g., geolocation, etc.). To conserve energy associated with bi-directional communications with wireless network devices (e.g., access points, gateway devices, etc.), and to limit data/information processing resources associated with such bi-directional communications, the user device may quickly and reliably determine its own location based on periodically received mapping information provided by a gateway device (e.g., a long-range (LoRa) device, a computing device, cloud device, etc.).

The mapping information may include a location associated with each network device (e.g., access points, routers, long-range (LoRa) access points, edge devices, etc.) within (or exceeding) a transmission/broadcast range of the gateway device. The mapping information may include identifier information (e.g., MAC address, unique device identifier, service set identifier, etc.) and location information/coordinate information (e.g., latitude, longitude, etc.) for each of a plurality of network devices (e.g., access points, routers, long-range (LoRa) access points, edge devices, etc.) within a geographical relative to the user device, such as within a proximity of the user device. A user device, such as a user device located in a vehicle moving within a geographical area, may receive mapping information that identifies a location of every network device within a proximity of the vehicle as the vehicle moves.

The mapping information may be localized in relation to the user device (e.g., data collection device, IoT device, end device, low-power device, sensor, etc.). The user device may use the mapping information to determine one or more network devices (e.g., access points, routers, long-range (LoRa) access points, edge devices, etc.) within a range (e.g., transmission range, broadcast range, proximity, etc.) of the user device. The user device may determine a range of signal detection (e.g., wireless network sniffer range, etc.) associated with the user device, and update the mapping information to remove one or more network devices from the mapping information that are not within the range.

To determine its own location, the user device may receive network information from the one or more network devices within range of the user device. The user device may receive the network information from the one or more network devices within range of the user device without requesting the network information, such as by sniffing/intercepting the network information. The user device may use wireless (e.g., Wi-Fi, etc.) positioning, based on the one or more network devices within the range of the user device, to quickly and reliably determine a location of the user device.

Figure 1:
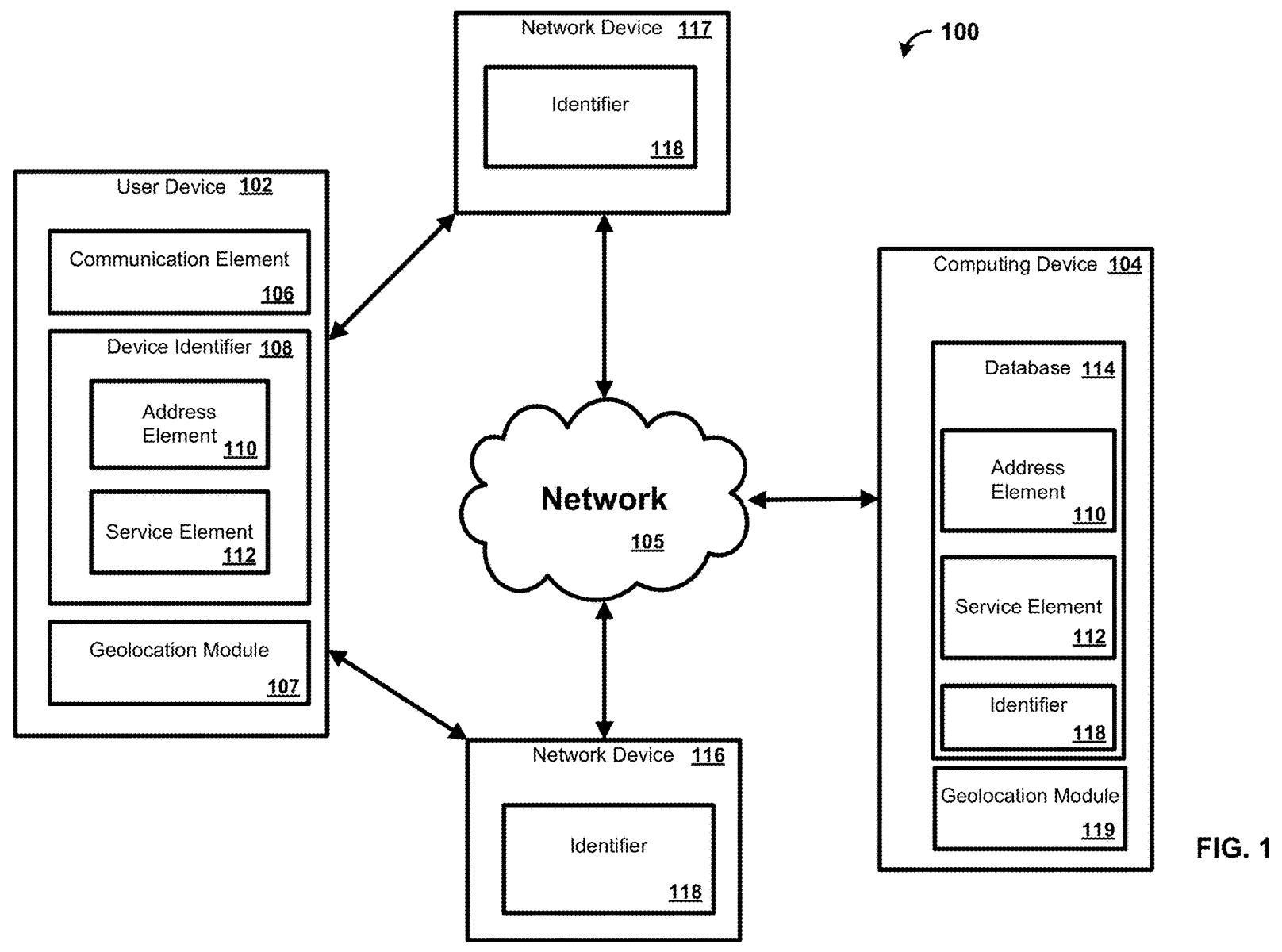

FIG. 1 shows a system 100 for localized geolocation. Those skilled in the art will appreciate that digital equipment and/or analog equipment may be employed. One skilled in the art will appreciate that provided herein is a functional description and that the respective functions may be performed by software, hardware, or a combination of software and hardware.

The system 100 may include network devices 116 and 117 (e.g., access points, routers, long-range (LoRa) access points, edge devices, etc.) in communication with a network such as a network 105. The network 105 may be a private and/or public network such as the Internet, a local area network, a low-power wide-area network (LPWAN). The network 105 may include and/or support many forms of communications, such as wired and wireless telecommunication channels.

The system 100 may have any quantity of network devices. Network devices may be located at any distance from or within any proximity (e.g., within a transmission/reception range, etc.) to a user device 102. One or more network devices may facilitate connecting a device (e.g., causing to be in communication with, etc.), such as the user device 102, to the network 105. The one or more network devices may be configured to allow one or more wireless devices (e.g., the user device 102, etc.) to connect to a wired and/or wireless network (e.g., the network 105, etc.) using Wi-Fi, BLUETOOTH®, LoRaWAN™, or any desired method or standard.

The network device 116 and network device 117 may be configured as a local area network (LAN). The network device 116 and network device 117 (or any other network device) may be may comprise a dual band wireless access point. The network device 116 and network device 117 may be configured with a first service set identifier (SSID) (e.g., associated with a user network or private network) to function as a local network for a particular user or users. The network device 116 and network device 117 may be configured with a second service set identifier (SSID) (e.g., associated with a public/community network or a hidden network) to function as a secondary network or redundant network for connected communication devices.

The network device 116 and network device 117 (or any other network device) may comprise an identifier 118. One or more identifiers may be or relate to an Internet Protocol (IP) Address IPV4/IPV6 or a media access control address (MAC address) or the like. One or more identifiers 118 may be a unique identifier for facilitating communications on the physical network segment. The network device 116 and network device 117 (or any other network device) may comprise a distinct identifier 118. The identifiers 118 may be associated with a physical location of the network device 116 and network device 117 (or any other network device). The user device 102 may be in communication (e.g., via the network device 116 and/or the network device 117, etc.) with a computing device 104 (e.g., a gateway device, a long-range (LoRa) device, a cloud device, a centralized network server, a gateway management server, etc.). The computing device 104 may be disposed locally or remotely relative to the user device 102.

The network device 116 and network device 117 (or any other network device) may determine their own location. The network device 116 and network device 117 (or any other network device) may determine their own location based on a RSSI localization technique. A RSSI localization technique may include a network device (e.g., the network device 116 and network device 117, etc.) measuring a signal strength received from one or more other network devices and analyzing the received a signal strengths relative to location information associated with the one or more other network devices to determine a distance between the one or more other network devices and its present location. The network device 116 and network device 117 (or any other network device) may store its present location as determined location information and/or send/provide the determined location information to another device, such as the computing device 104, to be stored as mapping information.

The user device 102 may be an electronic device such as an Internet of Things (IoT) device, an end device, a low-power device, a sensor, or any other device capable of communicating with the computing device 104. The user device 102 may comprise a communication element 106 for providing an interface to a user to interact with the user device 102 and/or the computing device 104. The communication element 106 may be any interface for presenting and/or receiving information to/from the user, such as user feedback. An interface may be communication interface such as a web browser (e.g., Internet Explorer®, Mozilla Firefox®, Google Chrome®, Safari®, or the like). Other software, hardware, and/or interfaces may be used to provide communication between the user and one or more of the user device 102 and the computing device 104. The communication element 106 may request or query various files from a local source and/or a remote source. The communication element 106 may receive data, such as mapping information, from a local or remote device such as the computing device 104.

The user device 102 (e.g., IoT device, end device, low-power device, sensor, etc.) may be associated with a user identifier or device identifier 108. The device identifier 108 may be any identifier, token, character, string, or the like, for differentiating one user or user device (e.g., user device 102) from another user or user device. The device identifier 108 may identify a user or user device as belonging to a particular class of users or user devices. The device identifier 108 may comprise information relating to the user device such as a manufacturer, a model or type of device, a service provider associated with the user device 102, a state of the user device 102, a locator, and/or a label or classifier. Other information may be represented by the device identifier 108.

The device identifier 108 may comprise an address element 110 and a service element 112. The address element 110 may comprise or provide an internet protocol address, a network address, a media access control (MAC) address, an Internet address, or the like. The address element 110 may be relied upon to establish a communication session between the user device 102 and the computing device 104 or other devices (e.g., the network device 116, the network device 117, etc.) and/or networks. The address element 110 may be used as an identifier or locator of the user device 102. The address element 110 may be persistent for a particular network.

The service element 112 may comprise an identification of a service provider associated with the user device 102 and/or with the class of user device 102. The class of the user device 102 may be related to a type of device, capability of device, type of service being provided, and/or a level of service (e.g., business class, service tier, service package, etc.). The service element 112 may comprise information relating to or provided by a communication service provider (e.g., Internet service provider) that is providing or enabling data flow such as communication services to the user device 102. The service element 112 may comprise information relating to a preferred service provider for one or more particular services relating to the user device 102. The address element 110 may be used to identify or retrieve data from the service element 112, or vice versa. The one or more of the address element 110 and the service element 112 may be stored remotely from the user device 102 and retrieved by one or more devices such as the user device 102 and the computing device 104. Other information may be represented by the service element 112.

The user device 102 (e.g., IoT device, end device, low-power device, sensor, etc.) may have a geolocation module 107. The geolocation module 107 may use mapping information to determine a location (e.g., geolocation, etc.) of the user device 102. The user device 102 may receive the mapping information from a device, such as the computing device 104 (e.g., a gateway device, a long-range (LoRa) device, a cloud device, etc.) or any other device.

The computing device 104 (e.g., a gateway device, a long-range (LoRa) device, a cloud device, a centralized network server, a gateway management server, etc.) may communicate with the user device 102 for providing data and/or services, such as localized geolocation services. The computing device 104 may provide any other services to the user device 102, such as network (e.g., Internet) connectivity, media management (e.g., media server), content services, streaming services, broadband services, or other network-related services. The system 100 may have one or more computing devices 104.

The computing device 104 (e.g., gateway device, long-range (LoRa) device, cloud device, centralized network server, gateway management server, etc.) may manage the communication between the user device 102 and a database 114 for sending and receiving data therebetween. The database 114 may store mapping information (e.g., device geolocation information, etc.), a plurality of files (e.g., web pages, etc.), user identifiers or records, or any other information. The user device 102 may request and/or retrieve a file from the database 114. The user device 102 may automatically receive a file from the database 114 without requesting the file. The database 114 may store information relating to the user device 102 such as the address element 110 and/or the service element 112. The computing device

104 may obtain the device identifier 108 of the user device 102 and retrieve information from the database 114 such as the address element 110 and/or the service elements 112. The computing device 104 may obtain the address element 110 from the user device 102 and may retrieve the service element 112 from the database 114, or vice versa. Any information may be stored in and retrieved from the database 114. The database 114 may be disposed remotely from the computing device 104 and accessed via direct or indirect connection. The database 114 may be integrated with the computing device 104 (e.g., a gateway device, a long-range (LoRa) device, a cloud device, etc.) or some other device or system.

The computing device 104 (e.g., gateway device, long-range (LoRa) device, cloud device, centralized network server, gateway management server, etc.) may have a geolocation module 119. The computing device 104 may use the geolocation module 119 to determine mapping information. Mapping information may include a location of each network device (e.g., the network device 116, the network device 117, access point, router, long-range (LoRa) access point, edge device, etc.) within a geographical area. The computing device 104 may use the geolocation module 119 to determine mapping information based on any localization technique, such a global positioning system (GPS) device localization technique, a received signal strength indication (RSSI) localization technique, a time difference of arrival (TDOA) localization technique, an angle of arrival (AOA) localization technique, or any other localization technique.

An RSSI localization technique may include the geolocation module 119 measuring a signal strength received from one or more network devices (e.g., the network device 116, the network device 117, access points, routers, long-range (LoRa) access points, edge devices, etc.) and analyzing the information relative to a location of the computing device 104 to determine the distance between the computing device 104 and the network devices. The computing device 104 may include the distance between the computing device 104 and the network devices along with the mapping information. An RSSI localization technique may include the geolocation module 119 measuring a signal strength from the user device 102 to one or more network devices (e.g., the network device 116, the network device 117, access points, routers, long-range (LoRa) access points, edge devices, etc.) and analyzing the information to determine the distance between the user device 102 and the network devices. An RSSI localization technique may include the geolocation module 119 sending a signal (e.g., beacon, etc.) to the user device 102 and the user device 102 determining signal strength of the signal. The user device 102 may determine a location of the user device 102 by comparing the received signal strength from the geolocation module 119 to stored location/distance information associated with the computing device 104. Stored location/distance information may include, but not be limited to, addresses/coordinates associated with network devices, gateway devices, management devices, and/or the like. Stored location/distance information may include, but not be limited to, distances (e.g., miles, meters, feet, inches, travel times, etc.) between network devices, gateway devices, management devices, and/or the like. Stored location/distance information may include, but not be limited to, any information associated with determining a location of a device.

The geolocation module 119 may use triangulation, and/or multi-lateration techniques to determine/calculate a location of the user device 102 relative to a known location (e.g., coordinates, address, etc.) of the network devices (e.g., the network device 116, the network device 117, access points, routers, long-range (LoRa) access points, edge devices, etc.). A time difference of arrival (TDOA) localization technique may include the geolocation module 119 determining a distance between a transmitting device (e.g., the network device 116, the network device 117, etc.) and a receiving device (e.g., the computing device 104, etc.) based on timestamping signals according to a measured signal propagation time and known signal velocity. The computing device 104 may use the geolocation module 119 to determine mapping information based on any suitable method and/or technique.

The computing device 104 (e.g., gateway device, long-range (LoRa) device, cloud device, centralized network server, gateway management server, etc.) may be configured to receive (e.g., via the geolocation module 119, etc.) mapping information from multiple sources. The computing device 104 may combine mapping information from the multiple sources and may distribute the mapping information to the user device 102 and/or another computing device 104. The computing device 104 may determine (e.g., via the geolocation module 119, etc.) mapping information. The computing device 104 may determine the mapping information based on passive/active data collection, network provisioning, network discovery, manual configuration, or any suitable method/procedure. The mapping information may include coordinate information (e.g., latitude, longitude, etc.) associated with each network device within the geographical area. The mapping information may have identifier information (e.g. identifier 118, MAC address, unique device identifier, service set identifier, etc.) associated with each network device (e.g., network device 116, network device 117, access point, router, long-range (LoRa) access point, edge device, etc.) within the geographical area. Identifier information may be any uniquely identifiable attribute that may be linked to a network device and/or location. Such attributes may include one or more of an IP Address, serial number, latitude/longitude, geo-encoding, custom assigned unique identifier, global unique identifier (GUID), and the like. The mapping information may have any information associated with each network device (e.g., network device 116, network device 117, access point, router, long-range (LoRa) access point, edge device, etc.) within the geographical area. The geographical area may be relative to the computing device 104, such as a city, town, or locale within which the computing device 104 is located. The geographical area may be relative to the user device 102, such as an area covering a proximity related to the user device 102. A user device (e.g., the user device 102, etc.) located in a vehicle may receive mapping information that identifies a location of every network device within a proximity of the user device and updates as the vehicle moves. The computing device 104 (e.g., gateway device, long-range (LoRa) device, cloud device, centralized network server, gateway management server, etc.) may send (e.g., provide, distribute, etc.) mapping information to another computing device 104 and/or the user device 102 (e.g., IoT device, end device, low-power device, sensor, etc.). To reduce the amount (and/or complexity) of information/data sent to the user device 102, mapping information may be specifically relative to the user device 102 by excluding location information associated with network devices (e.g., the network device 116, the network device 117, access points, routers, long-range (LoRa) access points, edge devices, etc.) outside a geographical area, such as network devices located at a distance from the location of the user device 102 that satisfies/exceeds a distance threshold, and/or are outside of a communication range of the user device 102. The location of the user device 102 may be static or dynamic. The mapping information may have a location of each network device (e.g., the network device 116, the network device 117, access point, router, long-range (LoRa) access point, edge device, etc.) within a geographical area. The mapping information may have coordinate information (e.g., latitude, longitude, etc.) associated with each network device within the geographical area. The geographical area may be a building, a neighborhood, a city, and/or the like. The geographical area may be an area of any size. The user device 102 may use the distance between the computing device 104 and the network devices to assist in determining a location (e.g., geolocation, etc.) of the user device. A user device (e.g., the user device 102, a data collection device, an IoT device, an end device, a low-power device, a sensor, etc.) located on Market Street in Philadelphia, Pennsylvania may receive the mapping information from a computing device (e.g., the computing device 104, a gateway device, a long-range (LoRa) device, a cloud device, etc.) that includes location information for each network device within a 50 mile radius (or any distance radius) from the user device location on Market Street. The computing device 104 may reduce the amount (and/or complexity) of information/data sent to the user device 102 to cause the user device 102 to conserve/reduce energy and processing resources when executing geolocation operations.

The computing device 104 (e.g., gateway device, long-range (LoRa) device, cloud device, etc.) may send (e.g., provide, distribute, etc.) the mapping information to the user device 102 using any suitable wireless protocol, such as Wi-Fi (IEEE 802.11), BLUETOOTH®, cellular, satellite, infrared, or any other suitable wireless standard. The computing device 104 may send (e.g., provide, distribute, etc.) the mapping information to the user device 102 via a short-range communication technique (e.g., BLUETOOTH®, near-field communication, infrared, and the like). The computing device 104 may send (e.g., provide, distribute, etc.) the mapping information to the user device 102 via a long-range communication technique (e.g., Internet, cellular, satellite, and the like). The computing device 104 may send (e.g., provide, distribute, etc.) the mapping information to the user device 102 or any other device (e.g., the network device 116, the network device 117, etc.) via any suitable method, including any wireless communication technique and/or any wired communication technique.

The computing device 104 (e.g., gateway device, long-range (LoRa) device, cloud device, etc.) may determine that another computing device (e.g., gateway device, long-range (LoRa) device, cloud device, etc.) is attempting to execute functions in the system 100 similar to, or the same as the computing device 104. The computing device 104 may determine that another computing device within a proximity of the user device 102 is attempting to execute functions similar to, or the same as the computing device 104. The computing device 104 may determine that another computing device within a proximity of the user device 102 is attempting to determine/generate mapping information associated with the user device 102 (or any other user device) and/or send mapping information to the user device 102 (or any other user device). The computing device 104, based on a determination may that another computing device (e.g., gateway device, long-range (LoRa) device, cloud device, etc.) within a proximity of the user device 102 is attempting to determine/generate mapping information associated with the user device 102 (or any other user device) and/or send mapping information to the user device 102 (or any other user device), may send a signal to cause the other computing device to no longer determine/generate mapping information and/or send mapping information. Causing the other computing device to no longer determine/generate mapping information and/or send mapping information may conserve processing resources, conserve network resources, and cause a user device (e.g., the user device 102, a data collection device, an IoT device, an end device, a low-power device, a sensor, etc.) to conserve energy by processing a reduced amount of information when executing geolocation operations.

To conserve/reduce energy and processing resources when executing geolocation operations, the user device 102 may receive mapping information from the computing device 104 without requesting the mapping information. The user device 102 may receive the mapping information from the computing device 104 based on a periodic broadcast/transmission by the computing device 104. The computing device 104 may transmit and/or broadcast a beacon, or any other signal that has and/or is associated with the mapping information. The user device 102 may receive the mapping information from the computing device 104 based on a request for the mapping information. The user device 102 may receive the mapping information from any device or based on any communication technique.

The user device 102 may use the geolocation module 107 to localize mapping information relative to the user device 102. The geolocation module 107 may use the mapping information to determine one or more network devices (e.g., the network device 116, the network device 117, access points, routers, long-range (LoRa) access points, edge devices, etc.) within a range (e.g., transmission range, broadcast range, proximity, etc.) of the user device 102. The user device 102 may determine the one or more network devices based on a range of signal detection (e.g., wireless network sniffer range, etc.) associated with the user device 102. The user device 102 may update the mapping information to remove one or more network devices (e.g., the network device 116, the network device 117, access points, routers, long-range (LoRa) access points, edge devices, etc.) from the mapping information that are not within the range. The user device 102 may localize mapping information relative to the user device 102 based on a data rate of respective communication signals (e.g., long-range signals such as Wi-Fi beacons, cellular signals, satellite signals, etc., and/or short-range communication signals such as BLUETOOTH®, ZIGBEE, Z-wave, near-field communication, infrared, etc.) associated with each network device of the one or more network devices identified by the mapping information, such that network devices with respective communication signals with a data rate that satisfies a threshold are retained in the mapping information and network devices with respective communication signals with a data rate that does not satisfy the threshold are removed from the mapping information. The user device 102 may localize mapping information relative to the user device 102 based on which channel a respective communication signal associated with each network device of the one or more network devices identified by the mapping information is received, such that network devices with respective communication signals that are received via a particular channel of a multi-channel transceiver of the user device 102 are retained in the mapping information and network devices with respective communication signals that are not received via the particular channel of the multi-channel transceiver of the user device 102 are removed from the mapping information. The user device 102 may localize mapping information relative to the user device 102 based on a respective signal strength and/or frequency of a communication signal associated with each network device of the one or more network devices identified by the mapping information, such that network devices with respective signal strengths and/or frequencies of respective communication signals that satisfy a threshold are retained in the mapping information and network devices with respective signal strengths and/or frequencies of respective communication signals that do not satisfy the threshold are removed from the mapping information.

To determine a location (e.g., geolocation, etc.) of the user device 102, the user device 102 may receive network information from the one or more network devices (e.g., the network device 116, the network device 117, access points, routers, long-range (LoRa) access points, edge devices, etc.) within range of the user device 102. The user device 102 may receive the network information (e.g., beacons, received signal strength indication (RSSI), data transmissions, etc.) from the one or more network devices within the range of the user device 102 without requesting the network information, such as by sniffing/intercepting the network information (e.g., beacons, received signal strength indication (RSSI), data transmissions, etc.).

The user device 102 may use the network information to determine a location of the user device 102 (e.g., geolocation, etc.). The user device 102 may use wireless (e.g., Wi-Fi, etc.) positioning, based on the one or more network devices (e.g., the network device 116, the network device 117, access points, routers, long-range (LoRa) access points, edge devices, etc.) within the range of the user device 102, to determine the location (e.g., geolocation, etc.) of the user device 102. The user device 102 may intercept a data packet (e.g., included in the network information) sent from the network device 116, the network device 117, or any other network device. The user device 102 may determine a data rate of the data packet. The user device may analyze the data rate in accordance with the location of the network device 116, the location of the network device 117, or the location of any other network device identified by the mapping information to determine a location of the user device 102. The user device 102 may determine, based on a data rate of an intercepted data packet and a location of a network device (e.g., the network device 116, the network device 117, etc.) that sent the packet, an approximate location of the user device 102. The user device may execute similar analysis based on a data packet received from each network device identified by mapping information and combine the analysis results to improve accuracy of a determined location of the user device 102.

The user device 102 may determine, based on network information including a received signal strength indication (RSSI) associated with each network device of one or more network devices (e.g., the network device 116, the network device 117, etc.) within the range of the user device and mapping information that indicates a location of each network device of the one or more network devices (e.g., the network device 116, the network device 117, etc.), a location of the user device 102. The user device 102 may use the distance between the computing device 104 and the network devices to assist in determining the location of the user device 102. The user device 102 may use mapping information to determine a location of the user device 102 by any method.

FIG. 2 shows a system 200 for localized geolocation. Those skilled in the art will appreciate that digital equipment and/or analog equipment may be employed. One skilled in the art will appreciate that provided herein is a functional description and that the respective functions may be performed by software, hardware, or a combination of software and hardware.

The system 200 may include a gateway management device 201 (e.g., the computing device 104, a long-range (LoRa) device, a cloud device, a central server, etc.). May determine device location information for a plurality of devices (e.g., network devices, access points, gateway devices, routers, communication terminals, etc.), such as some or all devices in communication with a network and/or within a geographical area 202. The gateway management device 201 may determine the device location information based on passive/active data collection, network provisioning, network discovery, manual configuration, or any suitable method/procedure. The device location information may include location information (e.g., coordinates, addresses, network addresses, geolocations, etc.) associated with each network device within the geographical area 202. Device location information may include location information for a plurality of network devices (e.g., access points, routers, long-range (LoRa) access points, edge devices, etc.), such as network devices 203-209, or gateway devices (e.g., the computing device 104, long-range (LoRa) devices, cloud devices, etc.), such as the gateway device 210, within the geographical area 202. The device location information may have identifier information associated with the network devices 203-209 and the gateway device 210. Identifier information may be any uniquely identifiable attribute that may be linked to a network device, gateway device, and/or location. Such attributes may include one or more of an IP Address, serial number, latitude/longitude, geo-encoding, custom assigned unique identifier, global unique identifier (GUID), and the like. The device location information may include any information associated with the network devices 203-209 and the gateway device 210.

The gateway management device 201 may send/provide the gateway device 210 information that the gateway device 210 may send/provide to a user device 211 (e.g., the user device 102, an IoT device, an end device, a low-power device, a sensor, etc.). The gateway management device 201 may send/provide the information consistently, periodically, or according to any frequency of occurrence. The gateway management device 201 may send/provide the information based on a request from the gateway device 210, a network device, and/or any device in communication with a network associated with the gateway management device 201. The gateway management device 201 may send/provide the information via one or more or a unicast or a multicast transmission. The gateway management device 201 may send/provide the information based on and/or according to any protocol and/or communication technique.

To reduce the amount of data sent/provided and/or to reduce the use of resources (e.g., processing resources, transmission resources, power and/or other device related resources, etc.), instead of sending/providing the gateway device 210 the device location information that includes location device for each of the network devices 203-209, gateway management device 201 may send/provide the gateway device 210 a reduced amount of data/information. The reduced amount of data/information may be location information that includes a location of every network device within a signal (e.g., network information, a beacon, a broadcast, a notification, data/information, etc.) range of the gateway device 210, such as the communication range 212. The location information that gateway device 210 may exclude location information for the network devices 207-209 because the network devices 207-209 are outside of the communication range 212.

The gateway device 210, based on the location information, may send/provide mapping information to the user device 211. The mapping information may include a location (e.g., geolocation, coordinates, address etc.) of the network devices 203-206 because the network devices 203-206 are within the communication range 212.

The user device 211 may use the mapping information to determine a location of the user device 211. To user device 211 may use the mapping information to determine a location of the user device 211 to provide location-based services to a user. To user device 211 may use the mapping information to determine a location of the user device 211 to interact with a local area network (or the like) and/or devices within the local area network. To user device 211 may use the mapping information to determine a location of the user device 211 as a step and/or portion of an authentication (e.g., authorization, verification, push, login procedure, etc.) and or the like. To user device 211 may use the mapping information to determine a location of the user device 211 for any reason.

The user device 211 may receive, intercept, sniff, and/or the like network information (e.g., signals, broadcast notifications, data/information, Wi-Fi signals, etc.) from network devices to determine a location of the user device 211. To reduce the amount of resources (e.g., processing resources, transmission resources, power and/or other device related resources, etc.) associated with determining a location of the user device 211, the user device 211, based on the mapping information, may identify a location of the network device 204 and the network device 206 and receive, intercept, sniff, and/or the like network information from the network device 204 and the network device 206. The user device 211 may identify the locations of the network device 204 and the network device 206 because the network device 204 and the network device 206 may be within a communication range of the user device 211. The user device may remove/exclude the location information for the network device 203 and the network device 205 from the mapping information and not attempt to receive, intercept, sniff, and/or the like network information from the network device 203 and the network device 205 because the network device 203 and the network device 205 may not be within communication range (or within partial communication/weak signal range, etc.) of the user device 211.

The user device 211 may use network information to determine a location of the user device 211 based on wireless (e.g., Wi-Fi, etc.) positioning, received signal strength indications (RSSIs) associated with the network device 204 and the network device 206, and/or the like. The user device 211 may use the mapping information to determine a location of the user device 211 by any method.

Figure 3A:
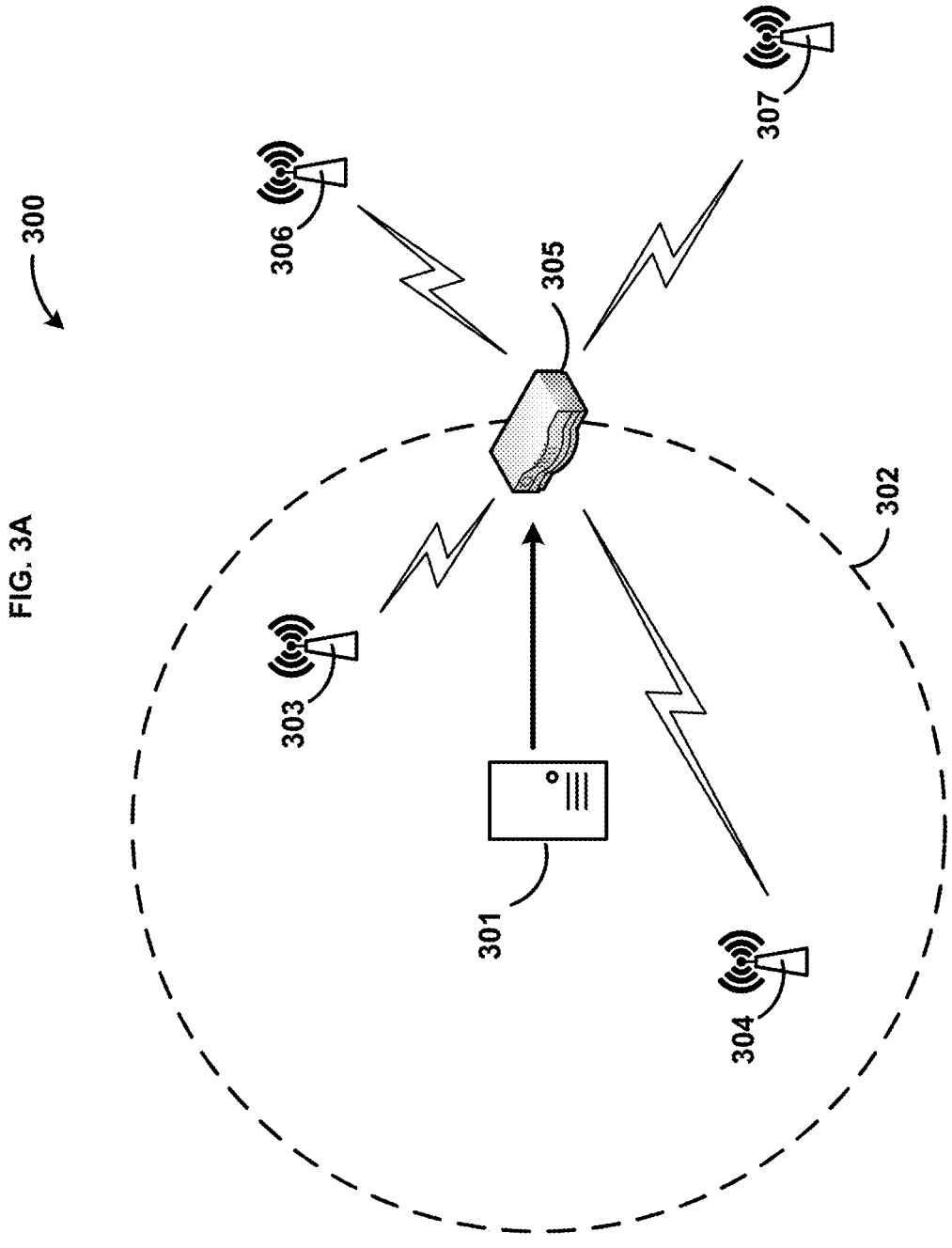
FIG. 3A shows a system for localized geolocation.

FIG. 3A shows a system 300 for localized geolocation. Those skilled in the art will appreciate that digital equipment and/or analog equipment may be employed. One skilled in the art will appreciate that provided herein is a functional description and that the respective functions may be performed by software, hardware, or a combination of software and hardware.

The system 300 may include a gateway device 301 (e.g., the computing device 104, a long-range (LoRa) device, a cloud device, a central server, etc.). The gateway device 301 may determine device location information for a plurality of devices (e.g., network devices, access points, gateway devices, routers, communication terminals, etc.), such as some or all devices in communication range 302 of the gateway device 301. The communication range 302 may include a distance the gateway device 301 may send/transmit a signal (e.g., a beacon, a broadcast, a notification, data/information, etc.). The communication range 302 may be an area where gateway device 301 may receive a signal (e.g., network information, a beacon, a broadcast, a notification, data/information, etc.) from one or more network devices (e.g., access points, gateway devices, routers, communication terminals, etc.), such as a network device 303 and a network device 304.

A user device 305 (e.g., the user device 102, the user device 211, an IoT device, an end device, a low-power device, a sensor, etc.) at an edge and/or extent of the communication range 302 may receive, intercept, sniff, and/or the like communications (e.g., network information, signals, broadcast notifications, data/information, Wi-Fi signals, etc.) from network devices within the communication range 302 such as the network device 303 and the network device 304. The user device 305 may receive, intercept, sniff, and/or the like communications (e.g., network information, signals, broadcast notifications, data/information, Wi-Fi signals, etc.) from network devices (e.g., access points, gateway devices, routers, communication terminals, etc.) outside of the communication range 302 such as a network device 306 and a network device 307.

The gateway device 301 may send (e.g., provide, distribute, etc.) mapping information to the user device 305. The mapping information may include a location (e.g., geolocation, coordinates, address etc.) of network devices within the communication range 302, such as the network device 303 and the network device 304. The mapping information may include a location (e.g., geolocation, coordinates, address etc.) of network devices outside of the communication range 302 that are within a communication range of the user device 305, such as the network device 306 and the network device 307. In some cases, the mapping information may include a location (e.g., geolocation, coordinates, address etc.) of network devices within a geographical area, such as a building, a street, a neighborhood, a city, a state, and/or the like. The mapping information may have identifier information associated with the network device 303, the network device 304, the network device 306, and/or the network device 307. Identifier information may be any uniquely identifiable attribute that may be linked to a network device and/or location. Such attributes may include one or more of an IP Address, serial number, latitude/longitude, geo-encoding, custom assigned unique identifier, global unique identifier (GUID), and the like. The mapping information may include any information associated with the network device 303, the network device 304, the network device 306, and/or the network device 307.

The user device 305, based on the mapping information, may identify a location of the network device 303, the network device 304, the network device 306, and/or the network device 307, and receive, intercept, sniff, and/or the like communications (e.g., signals, broadcast notifications, data/information, Wi-Fi signals, etc.) from the network device 303, the network device 304, the network device 306, and/or the network device 307 to determine a location of the user device 305. The user device 305, based on the mapping information, may determine network information associated with the network device 303, the network device 304, the network device 306, and/or the network device 307. Network information may include any information communicated by the network device 303, the network device 304, the network device 306, and/or the network device 307, such as signals, broadcast notifications, data/information, Wi-Fi signals, and/or any information/communication. The user device 305 may use network information to determine a location of the user device 305. For example, the user device 305 may use wireless (e.g., Wi-Fi, etc.) positioning, received signal strength indications (RSSIs), and/or the like the network device 303, the network device 304, the network device 306, and/or the network device 307 to determine a location of the user device 305. The user device 305 may use the mapping information to determine a location of the user device 305 by any method.

Figure 3B:
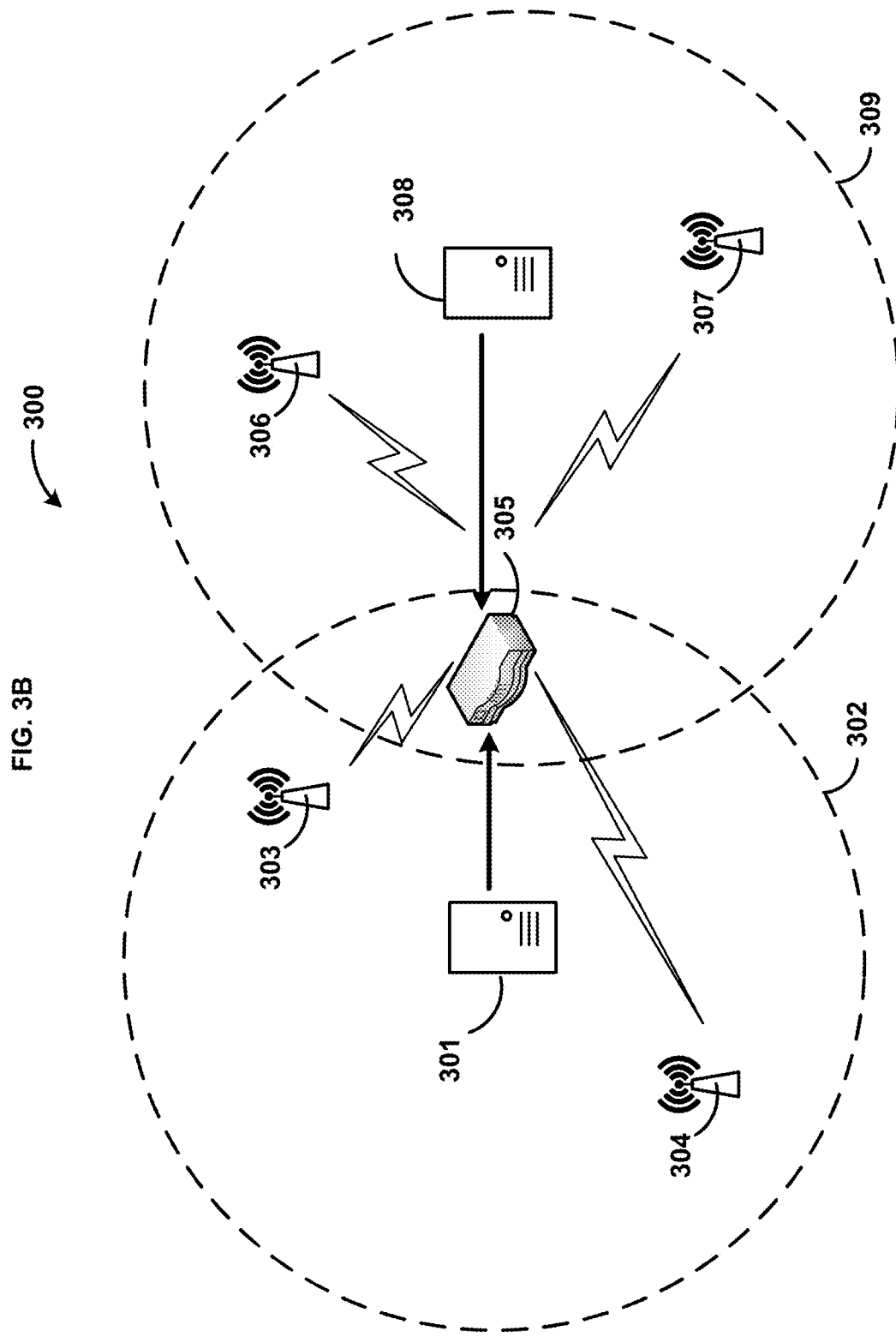
FIG. 3B shows a system for localized geolocation.

FIG. 3B shows the system 300 for localized geolocation and includes a gateway device 308 (e.g., the computing device 104, a long-range (LoRa) device, a cloud device, a central server, etc.). The gateway device 308 may be configured to operate in the same manner as the gateway device 301. The gateway device 308 may determine device location information for a plurality of devices (e.g., network devices, access points, gateway devices, routers, communication terminals, etc.), such as some or all devices in communication range 309 of the gateway device 308. The communication range 309 may include a distance the gateway device 308 may send/transmit a signal (e.g., a beacon, a broadcast, a notification, data/information, etc.). The communication range 309 may be an area where gateway device 308 may receive a signal (e.g., network information, a beacon, a broadcast, a notification, data/information, etc.) from one or more network devices (e.g., access points, gateway devices, routers, communication terminals, etc.), such as the network device 306 and the network device 307.

The gateway device 308 may send (e.g., provide, distribute, etc.) mapping information to the user device 305. The mapping information may include a location (e.g., geolocation, coordinates, address etc.) of network devices within the communication range 309, such as the network device 308 and the network device 307. The mapping information may include a location (e.g., geolocation, coordinates, address etc.) of network devices outside of the communication range 302 that are within a communication range of the user device 305, such as the network device 303 and the network device 304. In some cases, the mapping information may include a location (e.g., geolocation, coordinates, address etc.) of network devices within a geographical area, such as a building, a street, a neighborhood, a city, a state, and/or the like. The mapping information may have identifier information associated with the network device 303, the network device 304, the network device 306, and/or the network device 307. Identifier information may be any uniquely identifiable attribute that may be linked to a network device and/or location. Such attributes may include one or more of an IP Address, serial number, latitude/longitude, geo-encoding, custom assigned unique identifier, global unique identifier (GUID), and the like. The mapping information may include any information associated with the network device 303, the network device 304, the network device 306, and/or the network device 307.

The user device 305, based on the mapping information received from the gateway device 308, may identify a location of the network device 303, the network device 304, the network device 306, and/or the network device 307, and receive, intercept, sniff, and/or the like communications (e.g., signals, broadcast notifications, data/information, Wi-Fi signals, etc.) from the network device 303, the network device 304, the network device 306, and/or the network device 307 to determine a location of the user device 305. The user device 305, based on the mapping information received from the gateway device 308, may determine network information associated with the network device 303, the network device 304, the network device 306, and/or the network device 307. Network information may include any information communicated by the network device 303, the network device 304, the network device 306, and/or the network device 307, such as signals, broadcast notifications, data/information, Wi-Fi signals, and/or any information/ communication. The user device 305 may use network information to determine a location of the user device 305. For example, the user device 305 may use wireless (e.g., Wi-Fi, etc.) positioning, received signal strength indications (RSSIs), and/or the like the network device 303, the network device 304, the network device 306, and/or the network device 307 to determine a location of the user device 305. The user device 305 may use the mapping information to determine a location of the user device 305 by any method.

The gateway device 308 may determine that the gateway device 301 is attempting to execute functions/operations in the system 300 similar to, or the same as the gateway device 308. The gateway device 308 may determine that the gateway device 301 is within a proximity of the user device 305 and is attempting to execute functions similar to, or the same as the gateway device 308. The gateway device 308 may determine that the gateway device 301 is within a proximity of the user device 305 and is attempting to determine/ generate mapping information associated with the user device 305 (or any other user device) and/or send mapping information to the user device 305 (or any other user device). The gateway device 308, based on a determination that the gateway device 301 is attempting to determine/ generate mapping information associated with the user device 305 (or any other user device) and/or send mapping information to the user device 305 (or any other user device), may cause the gateway device 301 to no longer determine/generate mapping information and/or send mapping information to the user device 305. Causing the gateway device 301 to no longer determine/generate mapping information and/or send mapping information to the user device 305 may conserve processing resources, conserve network resources, and cause the user device 305 to conserve energy by processing a reduced information/data amount when executing geolocation operations. The gateway device 308, based on a determination that the gateway device 301 is attempting to determine/generate mapping information associated with the user device 305 (or any other user device) and/or send mapping information to the user device 305 (or any other user device), may cease determining/generating mapping information associated with the user device 305 (or any other user device) and/or sending mapping information to the user device 305, and allow the gateway device 301 to determine/generate mapping information associated with the user device 305 (or any other user device) and/or send mapping information to the user device 305.

Figure 4:
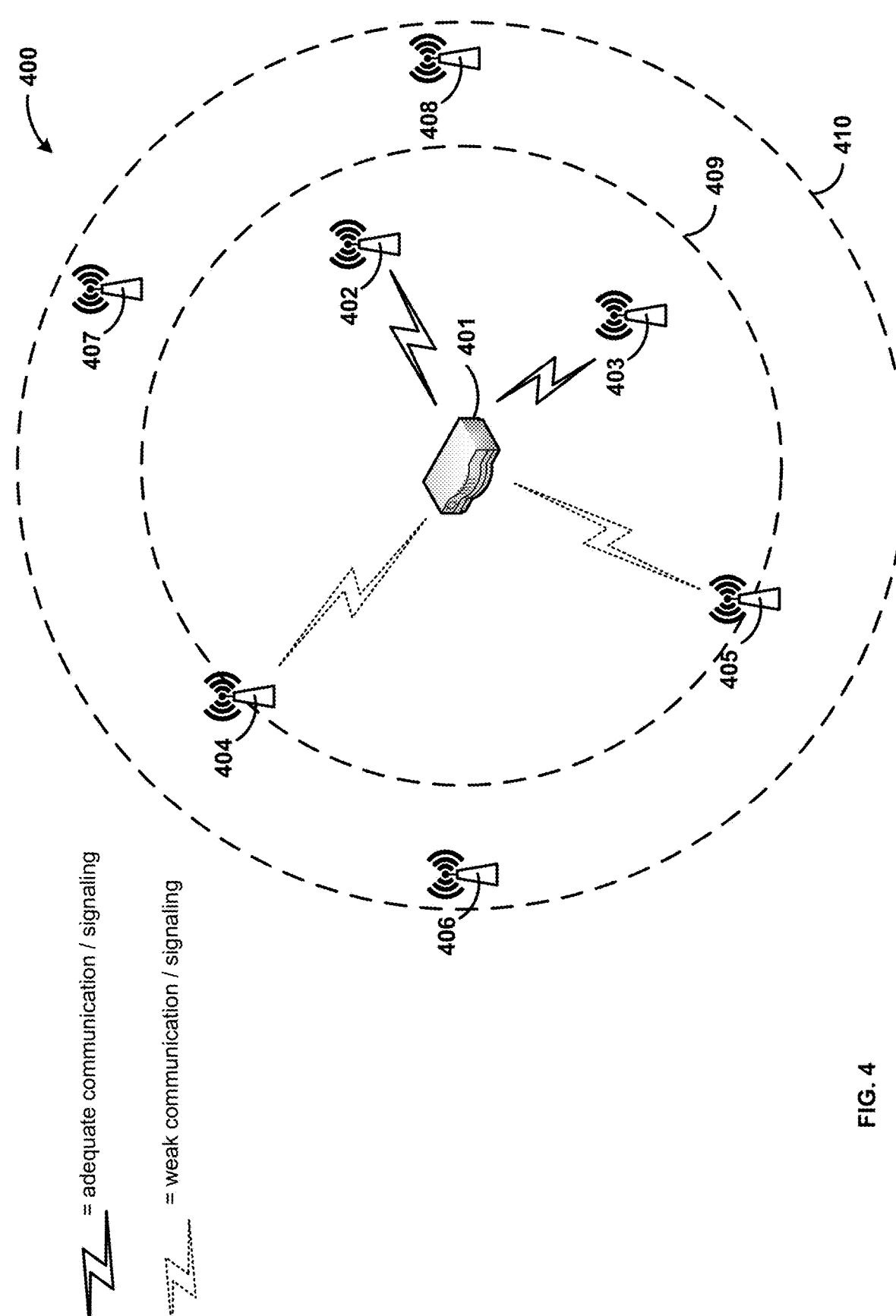
FIG. 4 shows a system for localized geolocation.

FIG. 4 shows a system 400 for localized geolocation. Those skilled in the art will appreciate that digital equipment and/or analog equipment may be employed. One skilled in the art will appreciate that provided herein is a functional description and that the respective functions may be performed by software, hardware, or a combination of software and hardware.

The system 400 may include a user device 401 (e.g., the user device 102, the user device 211, the user device 305, an IoT device, an end device, a low-power device, a sensor, etc.) in a geographical area 410 relative to the user device 401, such as a building, a street, a neighborhood, a city, a state, and/or the like. The geographical area 410 may include network devices (e.g., access points, routers, long-range (LoRa) access points, edge devices, etc.), such as a network devices 402-408. The user device 401 may determine a location (e.g., geolocation, coordinates, address etc.) of the user device 401 by receiving, intercepting, sniffing, and/or the like communications (e.g., network information, signals, broadcast notifications, data/information, Wi-Fi signals, etc.) from network devices. To conserve energy associated with communications (e.g., bi-directional communications, etc.) with network devices, and to limit data/information processing resources associated with such communications, the user device 401 may determine its own location based on periodically received mapping information.

To reduce the amount (and/or complexity) of information/ data sent to and/or received by the user device 401, to conserve energy associated with communications (e.g., bi-directional communications, etc.) with network devices, and/or to limit data/information processing resources associated with such communications required to determine a location (e.g., geolocation, coordinates, address etc.) of the user device 401, the mapping information may exclude location information associated with network devices within the geographical area 410 but outside a communication range 409 of the user device 401, such as the network device 406, the network device 407, and the network device 408. The mapping information may include network devices within the communication range 409, such as the network device 402, the network device 403, the network device 404, and the network device 405.

To further conserve energy associated with communications (e.g., bi-directional communications, etc.) with network devices, and to limit data/information processing resources associated with such communications required to determine a location (e.g., geolocation, coordinates, address etc.) of the user device 401, the mapping information may exclude network devices such as the network devices 404 and 405 that are within a communication range of the user device 401 and are associated with a weak and/or inadequate communication signal between the respective network device and the user device 401. The mapping information may include network devices such as the network devices 402 and 403 that are within a communication range of the user device 401 and are associated with a sufficient and/or adequate communication signal between the respective network device and the user device 401. The user device 401 may determine a communication/signal strength and/or adequacy of a network device within the communication range and modify the mapping information to include the network devices 402 and 403 and exclude the network devices 404 and 405.

The user device 401 may use the mapping information to determine a location (e.g., geolocation, coordinates, address etc.) of the user device 401. The user device 401 may receive, intercept, sniff, and/or the like communications (e.g., network information, signals, broadcast notifications, data/information, Wi-Fi signals, etc.) from the network devices 402 and 403 to determine a location of the user device 401.

Figure 5:
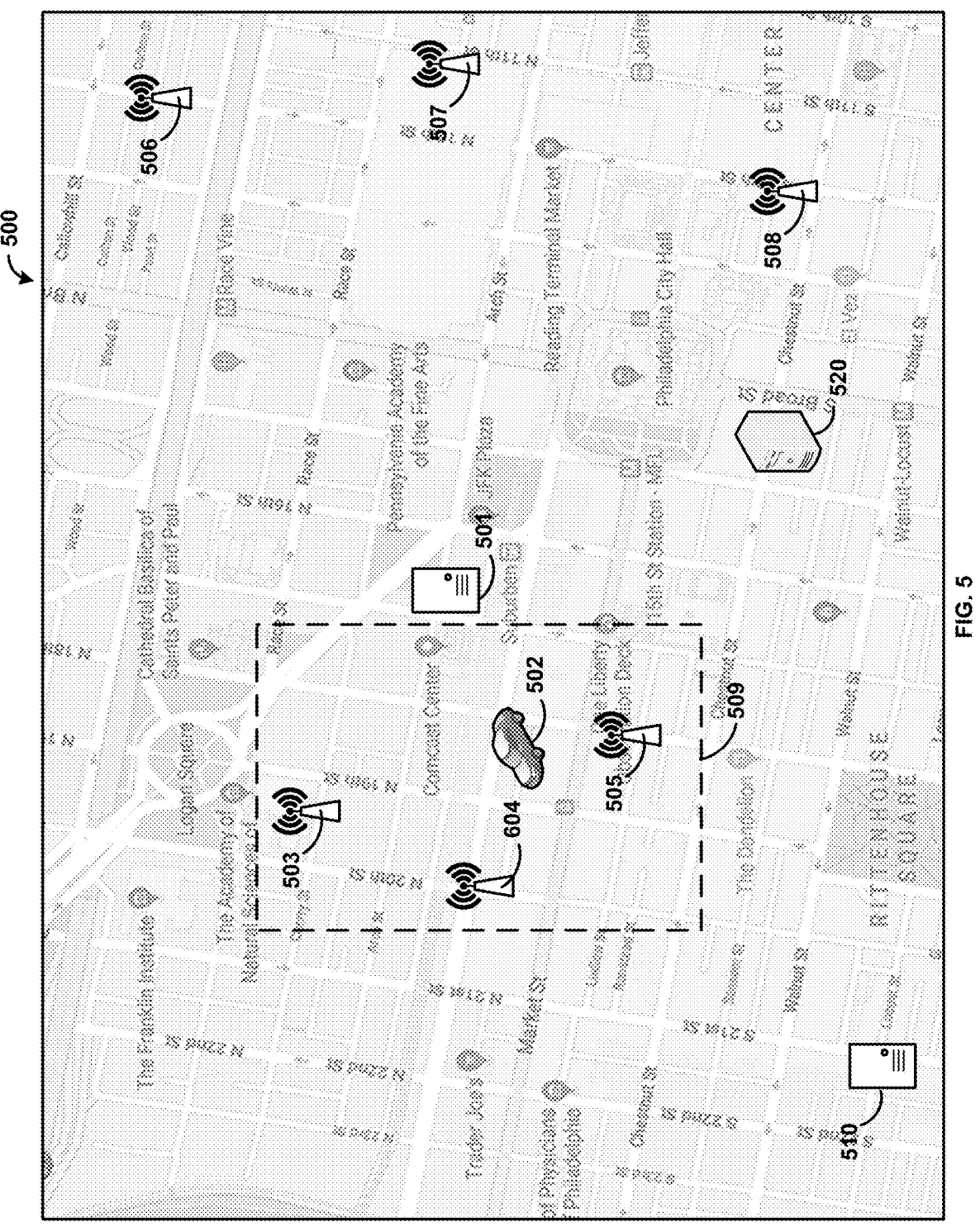
FIG. 5 shows a system for localized geolocation.

FIG. 5 shows a system 500 for localized geolocation. Those skilled in the art will appreciate that digital equipment and/or analog equipment may be employed. One skilled in the art will appreciate that provided herein is a functional description and that the respective functions may be performed by software, hardware, or a combination of software and hardware.

The system 500 may have a gateway device 501 (e.g., the computing device 104, a long-range (LoRa) device, cloud device, etc.) that sends (e.g., provides, distributes, etc.) mapping information to a user device 502 (e.g., an IoT device, an end device, a low-power device, a sensor, etc.). The user device 502 may be within a vehicle, or otherwise moving. The user device 502 may localize the mapping information to determine a location (e.g., geolocation, etc.) of the user device 502. The location (e.g., geolocation, etc.) of the user device 502 may be static, such as when the vehicle is parked, or dynamic, such as when the vehicle is moving.

The mapping information may have a location of each network device of a plurality of network devices within a geographical area. The geographical area shown in the system 500 is Philadelphia, Pennsylvania. The mapping information may have a location of a network device 503, a network device 504, a network device 505, a network device 506, a network device 507, and a network device 508. The geographical area may be relative to the user device 502, such as within a proximity of the user device 502. The gateway device 501 may determine that the network device 503, the network device 504, the network device 505, the network device 506, the network device 507, and the network device 508 are within a proximity of the user device 502 and include respective locations (e.g., geolocations, coordinates, address, etc.) of the network devices with the mapping information.

The mapping information may include additional information, such as capability information associated with the network device 503, the network device 504, the network device 505, the network device 506, the network device 507, and the network device 508. Capability information may identify a transmission/reception range, a type of service, or any other functional attributes associated with the network device 503, the network device 504, the network device 505, the network device 506, the network device 507, and the network device 508. The gateway device 501 may determine the capability information based on received signal strength indication (RSSI) measurements, stored information (e.g., stored by a network architect and/or provisioning system, etc.), or any other measurement associated with the network device 503, the network device 504, the network device 505, the network device 506, the network device 507, and the network device 508.

The gateway device 501 may send (e.g., provide, distribute, etc.) the mapping information to the user device 502 without the user device 502 requesting the mapping information. The gateway device 501 may send (e.g., provide, distribute, etc.) the mapping information to the user device 502 based on a periodic broadcast/transmission by the gateway device 501. The user device may receive the mapping information and localize the mapping information relative to the user device 502.

To localize the mapping information relative to the user device 502, the user device 502 may use the mapping information to determine one or more network devices within a communication range (e.g., transmission range, broadcast range, proximity, etc.) of the user device. The user device 502 may use the mapping information to determine that the network device 503, the network device 504, and the network device 505 are within a communication range 509. The communication range 509 may be based on a functional capability of the user device 502, such as a transmission range, a broadcast range, or the like associated with the user device 502. The user device 502 may update the mapping information to remove one or more network devices from the mapping information that are not within the range. The user device 502 may update the mapping information to remove the network device 506, the network device 507, and the network device 508 from the mapping information because they are outside of the communication range 509.

To determine a location (e.g., geolocation, etc.) of the user device 502, the user device 502 may receive network information (e.g., beacons, received signal strength indication (RSSI), data transmissions, etc.) from the network device 503, the network device 504, and the network device 505 within the communication range 509. The user device 502 may receive the network information the network device 503, the network device 504, and the network device 505 without requesting the network information, such as by sniffing/intercepting the network information. The user device 502 may use the network information to determine a location of the user device 502 (e.g., geolocation, etc.). The user device 502 may use wireless (e.g., Wi-Fi, etc.) positioning, based on the network device 504, and the network device 505 to determine location (e.g., geolocation, etc.) of the user device 502. The user device 502 may determine, based on network information including a received signal strength indication (RSSI) associated with the network device 503, the network device 504, and the network device 505 and a respective location of the network device 503, the network device 504, and the network device 505 identified by the mapping information, a location of the user device 502. The user device 502 may use localized mapping information to determine a location of the user device 502 by any method.

The gateway device 501 and other gateway devices may be in communication with, associated with, and/or serviced by a gateway management device 520 (e.g., centralized server, computing device, network device, etc.). The gateway management device 520 may provide gateway devices in communication with, associated with, and/or serviced by the gateway management device 520, information about and/or related to other gateway devices in communication with, associated with, and/or serviced by the gateway management device 520, such as gateway devices within a geographic area.

The gateway device 501 (e.g., gateway device, long-range (LoRa) device, computing device, cloud device, etc.) may determine (or the management device may inform the gateway device 501) that another gateway device 510 (e.g., the computing device 104, a long-range (LoRa) device, cloud device, etc.) is attempting to execute functions in the system 500 similar to, or the same as the gateway device 501. The gateway device 501 may determine (or the management device may inform the gateway device 501) that gateway device 510 is within a proximity of the user device 502 and is attempting to execute functions similar to, or the same as the gateway device 501. The gateway device 501 may determine (or the management device may inform the gateway device 501) that the gateway device 510 is within a proximity of the user device 502 and is attempting to determine/generate mapping information associated with the user device 502 (or any other user device) and/or send mapping information to the user device 502 (or any other user device). The gateway device 501, based on a determination (or information received from the management device) that the gateway device 510 is attempting to determine/generate mapping information associated with the user device 502 (or any other user device) and/or send mapping information to the user device 502 (or any other user device), may cause the gateway device 510 to no longer determine/generate mapping information and/or send mapping information to the user device 502. Causing the gateway device 510 to no longer determine/generate mapping information and/or send mapping information to the user device 502 may conserve processing resources, conserve network resources, and cause the user device 502 to conserve energy by processing a reduced information/data amount when executing geolocation operations. The gateway device 501, based on a determination (or information received from the management device) that the gateway device 510 is attempting to determine/generate mapping information associated with the user device 502 (or any other user device) and/or send mapping information to the user device 502 (or any other user device), may cease determining/generating mapping information associated with the user device 502 (or any other user device) and/or sending mapping information to the user device 502, and allow the gateway device 510 to perform/manage such functions.

Figure 6:
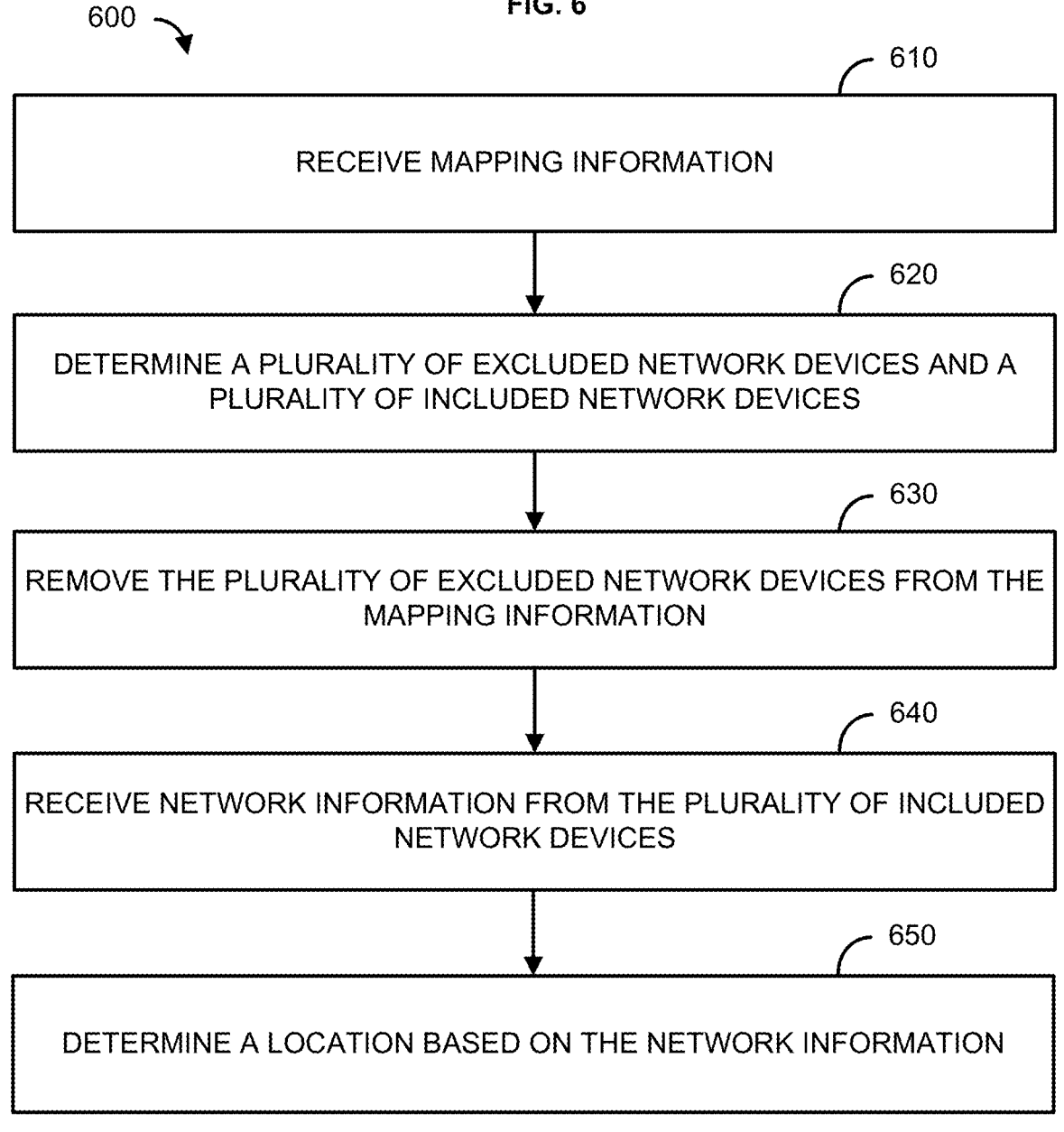
FIG. 6 shows a flowchart of a method for localized geolocation.

FIG. 6 shows a flowchart of a method 600 for localized geolocation. At 610, mapping information may be received. A user device (e.g., a data collection device, an Internet of Things (IoT) device, an end device, a low-power device, a sensor, etc.) may receive mapping information. The mapping information may include a respective location of each network device (e.g., access point, router, long-range (LoRa) access point, edge device, etc.) of a plurality of network devices within a geographical area. The geographical area may be relative to the user device, such as a communication range and/or proximity of the user device. The geographical area may be a building, a neighborhood, a city, and/or the like. The geographical area may be an area of any size.

The user device may receive the mapping information from a gateway device (e.g., the computing device 104, a long-range (LoRa) device, a computing device, a cloud device, etc.). The user device may receive the mapping information from the gateway device without requesting the mapping information. The user device may receive the mapping information from the gateway device based on a periodic broadcast/transmission by the gateway device. The gateway device may transmit and/or broadcast a beacon, or any other signal that has and/or is associated with the mapping information.

The user device may receive the mapping information from the gateway device based on a request for the mapping information. The user device may receive the mapping information from any device or based on any communication technique. The gateway device may send (e.g., provide, distribute, etc.) the mapping information to the user device using any suitable wireless protocol, such as Wi-Fi (IEEE 802.11), BLUETOOTH®, cellular, satellite, infrared, or any other suitable wireless standard. The gateway device may send (e.g., provide, distribute, etc.) the mapping information to the user device via a short-range communication technique (e.g., BLUETOOTH®, near-field communication, infrared, and the like). The gateway device may send (e.g., provide, distribute, etc.) the mapping information to the user device via a long-range communication technique (e.g., Internet, cellular, satellite, and the like). The gateway device may send (e.g., provide, distribute, etc.) the mapping information to the user device via any suitable method, including any wireless communication technique and/or any wired communication technique.

At 620, a plurality of excluded network devices of the plurality of network devices within the communication range of the data collection device, and a plurality of included network devices of the plurality of network devices within the communication range of the user device may be determined. The user device may determine the plurality of excluded network devices of the plurality of network devices within the communication range of the user device, and a plurality of included network devices of the plurality of network devices within the communication range of the user device. The user device may determine a plurality of signal (e.g., beacon, received signal strength indication (RSSI), data transmission, etc.) strengths, for example a respective signal strength associated with each network device of the plurality of network device within the communication range of the user device. The user device may determine whether a respective signal strength associated with each network device of the plurality of network device within the communication range of the user device satisfies a signal strength threshold. Network devices associated with signal strengths that do not satisfy the signal strength threshold may be associated with the plurality of excluded network devices of the plurality of network devices within the communication range of the user device. Network devices associated with signal strengths that satisfy the signal strength threshold may be associated with the plurality of included network devices of the plurality of network devices within the communication range of the user device.

At 630, the mapping information may be updated. The user device may update the mapping information. The user device may update the mapping information to remove the plurality of excluded network devices from the mapping information.

At 640 network information may be determined. The user device may determine the network information. The user device, based on updated mapping information, may execute operations using less energy and computational resources than would normally be required, based on a reduced amount to data/information to process, such as determine the network information. The user device may determine the network information by receiving, intercepting, sniffing, and/or the like communications (e.g., network information, signals, broadcast notifications, data/information, Wi-Fi signals, etc.) from the plurality of included network devices.

At 650 a location of the user device may be determined. The user device may determine the location of the user device based on the network information received from and/or associated with the plurality of included network devices. The network information may include one or more data rates associated with one or more packets sent by each network device of the plurality of included network devices. The network information may include a respective received signal strength indication (RSSI) for each network device of the plurality of included network devices. The network information may include any information associated with the plurality of included network devices.

The user device may use wireless (e.g., Wi-Fi, etc.) positioning, based on the plurality of included network devices and the network information, to determine a location of the user device. The user device may extract a data packet from the network information. The user device may determine a data rate of the data packet. The user device may analyze the data rate in accordance with a location, identified by the mapping information, of a network device of the plurality of included network devices. The user device may determine, based on the data rate of the data packet and the location of the network (that sent the packet), an approximate location of the user device. The user device may execute similar analysis based on a data packet received from each network device of the plurality of included network devices, and combine the analysis results to improve accuracy of the determined location of the user device. The user device may use the mapping information and/or network information to determine a location of the user device by any method.

FIG. 7 shows a flowchart of a method 700 for localized geolocation. At 710, mapping information may be received. A user device (e.g., a data collection device, an Internet of Things (IoT) device, an end device, a low-power device, a sensor, etc.) may receive mapping information. The mapping information may include a respective location of each network device (e.g., access point, router, long-range (LoRa) access point, edge device, etc.) of a plurality of network devices within a geographical area. The geographical area may be relative to the user device, such as a communication range and/or proximity of the user device. The geographical area may be a building, a neighborhood, a city, and/or the like. The geographical area may be an area of any size.

The user device may receive the mapping information from a gateway device (e.g., the computing device 104, a long-range (LoRa) device, a computing device, a cloud device, etc.). The user device may receive the mapping information from the gateway device without requesting the mapping information. The user device may receive the mapping information from the gateway device based on a periodic broadcast/transmission by the gateway device. The gateway device may transmit and/or broadcast a beacon, or any other signal that has and/or is associated with the mapping information.

The user device may receive the mapping information from the gateway device based on a request for the mapping information. The user device may receive the mapping information from any device or based on any communication technique. The gateway device may send (e.g., provide, distribute, etc.) the mapping information to the user device using any suitable wireless protocol, such as Wi-Fi (IEEE 802.11), BLUETOOTH®, cellular, satellite, infrared, or any other suitable wireless standard. The gateway device may send (e.g., provide, distribute, etc.) the mapping information to the user device via a short-range communication technique (e.g., BLUETOOTH®, near-field communication, infrared, and the like). The gateway device may send (e.g., provide, distribute, etc.) the mapping information to the user device via a long-range communication technique (e.g., Internet, cellular, satellite, and the like). The gateway device may send (e.g., provide, distribute, etc.) the mapping information to the user device via any suitable method, including any wireless communication technique and/or any wired communication technique.

At 720, a plurality of excluded network devices of the plurality of network devices within the communication range of the data collection device, and a plurality of included network devices of the plurality of network devices within the communication range of the user device may be determined. The user device may determine the plurality of excluded network devices of the plurality of network devices within the communication range of the user device, and a plurality of included network devices of the plurality of network devices within the communication range of the user device. The user device may determine a plurality of signal (e.g., beacon, received signal strength indication (RSSI), data transmission, etc.) strengths, for example a respective signal strength associated with each network device of the plurality of network device within the communication range of the user device. The user device may determine whether a respective signal strength associated with each network device of the plurality of network device within the communication range of the user device satisfies a signal strength threshold. Network devices associated with signal strengths that do not satisfy the signal strength threshold may be associated with the plurality of excluded network devices of the plurality of network devices within the communication range of the user device. Network devices associated with signal strengths that satisfy the signal strength threshold may be associated with the plurality of included network devices of the plurality of network devices within the communication range of the user device.

At 730, the mapping information may be updated. The user device may update the mapping information. The user device may update the mapping information to remove the plurality of excluded network devices from the mapping information.

At 740, a network device of the plurality of excluded network devices may be determined. The user device may determine the network device of the plurality of excluded network devices based on a signal strength associated with the network device satisfying the signal strength threshold. For example, the user device may change its geolocation (e.g., move, etc.) and cause the signal strength of the network device, which previously did not satisfy the signal strength threshold, to satisfy the signal strength threshold.

At 750, the mapping information may be updated. The user device, based on determining that the signal strength of the network device, that previously did not satisfy the signal strength threshold, satisfies the signal strength threshold, may associate the network device with the plurality of included network devices. The user device may update the mapping information to associate the network device with the plurality of included network devices.

The user device may determine network information. The user device, based on updated mapping information, may execute operations using less energy and computational resources than would normally be required, based on a reduced amount to data/information to process, such as determine the network information. The user device may determine the network information by receiving, intercepting, sniffing, and/or the like communications (e.g., network information, signals, broadcast notifications, data/information, Wi-Fi signals, etc.) from the plurality of included network devices.

The user device may determine the location of the user device based on the network information received from and/or associated with the plurality of included network devices. The network information may include one or more data rates associated with one or more packets sent by each network device of the plurality of included network devices. The network information may include a respective received signal strength indication (RSSI) for each network device of the plurality of included network devices. The network information may include any information associated with the plurality of included network devices.

The user device may use wireless (e.g., Wi-Fi, etc.) positioning, based on the plurality of included network devices and the network information, to determine a location of the user device. The user device may extract a data packet from the network information. The user device may determine a data rate of the data packet. The user device may analyze the data rate in accordance with a location, identified by the mapping information, of a network device of the plurality of included network devices. The user device may determine, based on the data rate of the data packet and the location of the network (that sent the packet), an approximate location of the user device. The user device may execute similar analysis based on a data packet received from each network device of the plurality of included network devices, and combine the analysis results to improve accuracy of the determined location of the user device. The user device may use the mapping information and/or network information to determine a location of the user device by any method.

Figure 8:
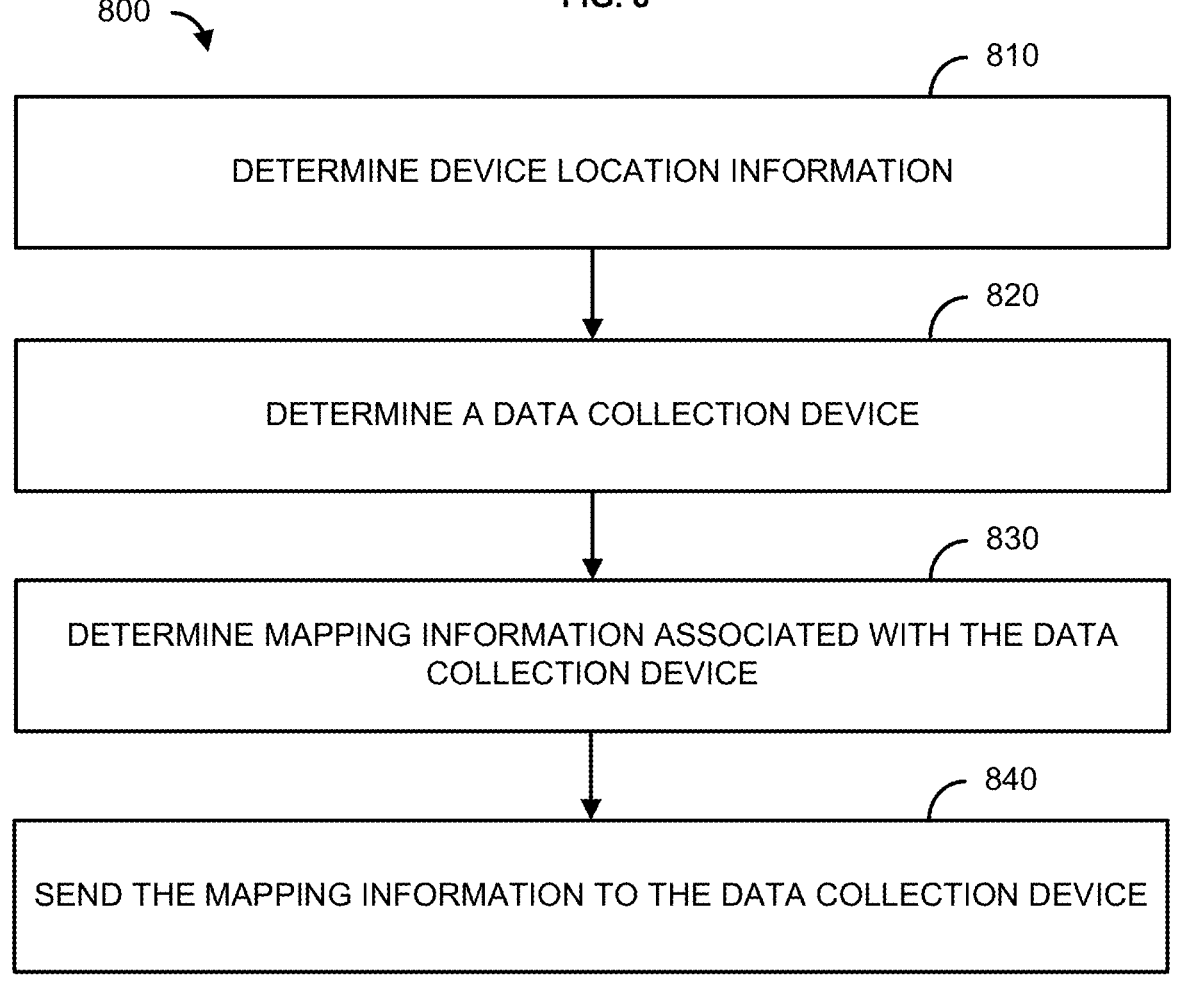
FIG. 8 shows a flowchart of a method for localized geolocation.

FIG. 8 shows a flowchart of a method 800 for localized geolocation. At 810, a gateway device (e.g., the computing device 104, a long-range (LoRa) device, a cloud device, a central server, etc.) may determine device location information and/or device configuration details (e.g., communication ranges, technical capabilities, etc.) for a plurality of devices (e.g., network devices, access points, gateway devices, routers, communication terminals, etc.), such as some or all devices in communication with a network and/or within a geographical area. The geographical area may be a building, a neighborhood, a city, and/or the like. The geographical area may be an area of any size. The gateway device may determine the device location information based on passive/active data collection, network provisioning, network discovery, manual configuration, or any suitable method/procedure. The device location information may include location information (e.g., coordinates, addresses, network addresses, geolocations, etc.) associated with each network device within the geographical area. The device location information may have identifier information associated with the network devices. Identifier information may be any uniquely identifiable attribute that may be linked to a network device and/or location. Such attributes may include one or more of an IP address, serial number, latitude/longitude, geo-encoding, custom assigned unique identifier, global unique identifier (GUID), and the like. The device location information may include any information associated with the network devices.

At 820, a user device (e.g., a data collection device, an Internet of Things (IoT) device, an end device, a low-power device, a sensor, etc.) may be determined. The gateway device may determine that the user device is within a communication range of the gateway device. In some instances, the gateway device may send a periodic broadcast/transmission signal that detects devices within the communication range of the gateway device. For example, the user device may be in a moving vehicle. When the vehicle moves within proximity to the gateway device, the gateway device may detect the presence of the user device based on one or more signals sent/broadcast by the gateway device.

At 830, mapping information may be determined. The gateway device may determine the mapping information based on the device location information and a communication range of the user device. In some instances, the gateway device may determine the device location information and the communication range of the user device based on, for example, one or more provisioned network and/or device parameters. In some instances, the gateway device may determine the device location information and the communication range of the user device based on the periodic broadcast/transmission by the gateway device and/or the like. The mapping information may include location information for network devices associated with the device location information and within the communication range. For example, the mapping information may indicate one or more network devices of the plurality of network devices that are within the communication range of the user device.

At 840, the mapping information may be sent. The gateway device may send the mapping information to the user device. The gateway device may send (e.g., provide, distribute, etc.) the mapping information to the user device using any suitable wireless protocol, such as Wi-Fi (IEEE 802.11), BLUETOOTH®, cellular, satellite, infrared, or any other suitable wireless standard. The gateway device may send (e.g., provide, distribute, etc.) the mapping information to the user device via a short-range communication technique (e.g., BLUETOOTH®, near-field communication, infrared, and the like). The gateway device may send (e.g., provide, distribute, etc.) the mapping information to the user device via a long-range communication technique (e.g., Internet, cellular, satellite, and the like). The gateway device may send (e.g., provide, distribute, etc.) the mapping information to the user device via any suitable method, including any wireless communication technique and/or any wired communication technique.

The user device may receive the mapping information from the gateway device without requesting the mapping information. The user device may receive the mapping information from the gateway device based on the periodic broadcasts/transmissions by the gateway device. The gateway device may transmit and/or broadcast a beacon, or any other signal that has and/or is associated with the mapping information. The user device may receive the mapping information from the gateway device based on a request for the mapping information. The user device may receive the mapping information based on any communication technique.

The user device may use the mapping information to determine network information. The user device may use the network information to determine a location of the user device. The user device, based on mapping information, may execute operations using less energy and computational resources than would normally be required, based on a reduced amount to data/information to process, such as determine the network information. The user device may determine the network information by receiving, intercepting, sniffing, and/or the like communications (e.g., network information, signals, broadcast notifications, data/information, Wi-Fi signals, etc.) from the plurality of network devices.

The user device may determine the location of the user device based on the network information received from and/or associated with the plurality of network devices associated with the mapping information, such as the one or more network devices of the plurality of network devices that are within the communication range of the user device. The network information may include one or more data rates associated with one or more packets sent by each network device of the plurality of network devices. The network information may include a respective received signal strength indication (RSSI) for each network device of the plurality of network devices. The network information may include any information associated with the plurality of network devices.

The user device may use wireless (e.g., Wi-Fi, etc.) positioning, based on the one or more network devices of the plurality of network devices and the network information, to determine a location of the user device. The user device may extract a data packet from the network information. The user device may determine a data rate of the data packet. The user device may analyze the data rate in accordance with a location, identified by the mapping information, of a network device of the plurality of network devices. The user device may determine, based on the data rate of the data packet and the location of the network (that sent the packet), an approximate location of the user device. The user device may execute similar analysis based on a data packet received from each network device of the plurality of network devices, and combine the analysis results to improve accuracy of the determined location of the user device. The user device may use the mapping information and/or network information to determine a location of the user device by any method.

Figure 9:
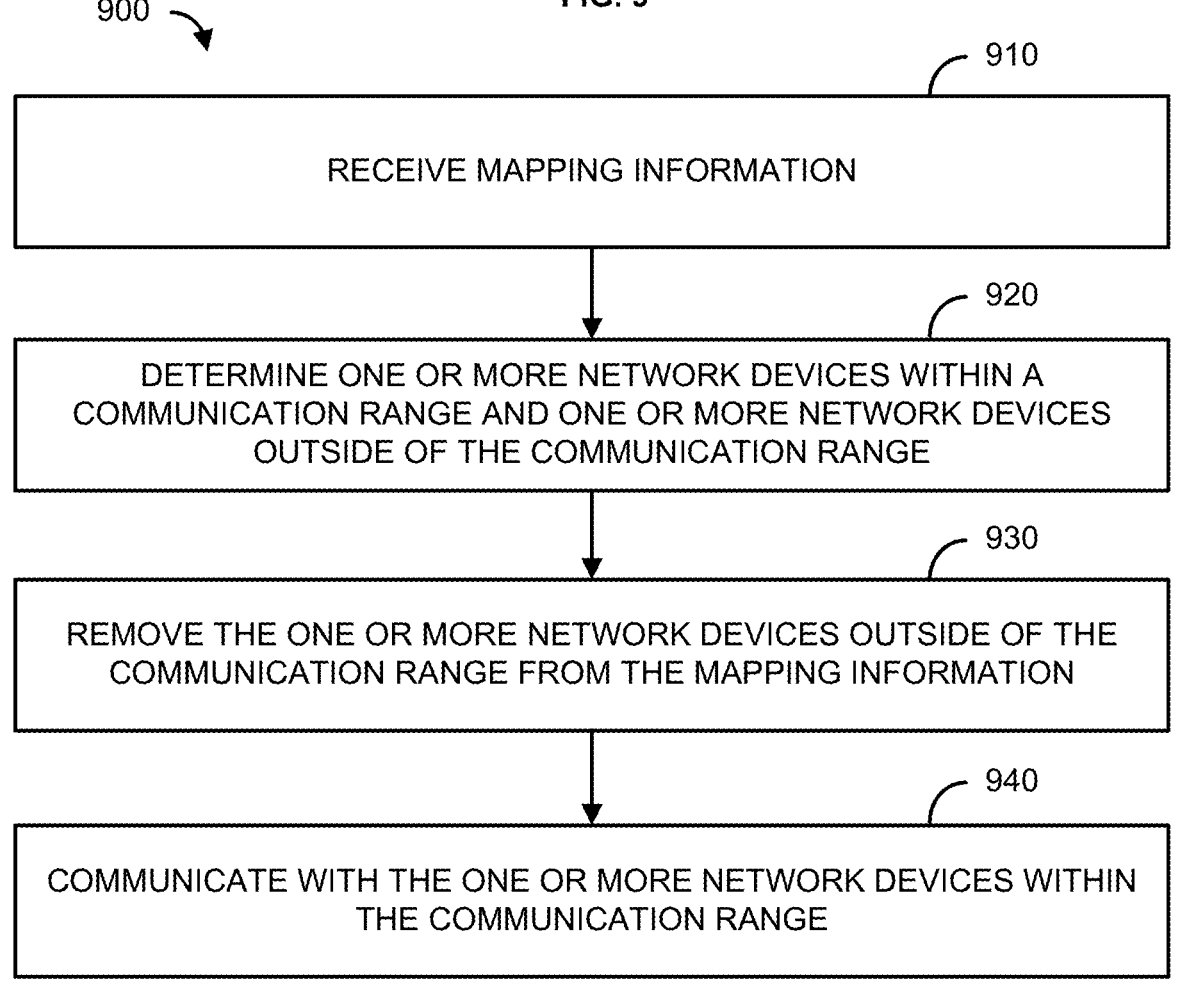
FIG. 9 shows a flowchart of a method for localized geolocation.

FIG. 9 shows a flowchart of a method 900 for localized geolocation. At 910, mapping information may be received. A user device (e.g., a data collection device, an Internet of Things (IoT) device, an end device, a low-power device, a sensor, etc.) may receive mapping information. The mapping information may include a respective location of each network device (e.g., access point, router, long-range (LoRa) access point, edge device, etc.) of a plurality of network devices within a geographical area. The geographical area may be relative to the user device, such as within a proximity of the user device. The geographical area may be a building, a neighborhood, a city, and/or the like. The geographical area may be an area of any size. A user device located on Market Street in Philadelphia, Pennsylvania may receive mapping information that includes location information for each network device within a 50 mile radius (or any distance radius) from the user device location on Market Street.

The user device may receive the mapping information from a gateway device (e.g., the computing device 104, the gateway device 201, the gateway device 210, a long-range (LoRa) device, a computing device, a cloud device, etc.). The user device may receive the mapping information from the gateway device without requesting the mapping information. The user device may receive the mapping information from the gateway device based on a periodic broadcast/transmission by the gateway device. The gateway device may transmit and/or broadcast a beacon, or any other signal that has and/or is associated with the mapping information.

The user device may receive the mapping information from the computing device based on a request for the mapping information. The user device may receive the mapping information from any device or based on any communication technique. The gateway device may send (e.g., provide, distribute, etc.) the mapping information to the user device using any suitable wireless protocol, such as Wi-Fi (IEEE 802.11), BLUETOOTH®, cellular, satellite, infrared, or any other suitable wireless standard. The gateway device may send (e.g., provide, distribute, etc.) the mapping information to the user device via a short-range communication technique (e.g., BLUETOOTH®, near-field communication, infrared, and the like). The gateway device may send (e.g., provide, distribute, etc.) the mapping information to the user device via a long-range communication technique (e.g., Internet, cellular, satellite, and the like). The gateway device may send (e.g., provide, distribute, etc.) the mapping information to the user device via any suitable method, including any wireless communication technique and/or any wired communication technique.

At 920, one or more network devices of the plurality of network devices within a communication range of the user device, and one or more network devices of the plurality of network devices outside of the communication range may be determined. The user device may determine one or more network devices of the plurality of network devices within a communication range of the user device, and one or more network devices of the plurality of network devices outside of the communication range. The user device may determine network devices within or outside of its communication range based on a capability of the user device and the respective location of each network device of the plurality of network devices identified by the mapping information. The capability of the user device may include the communication range of the user device. The user device may determine, for each network device, based on the respective location of the respective network device, whether communicating with the respective network device will or will not satisfy a capability threshold. The user device may determine one or more network devices within the communication range of the user device based on any suitable method.

At 930, the mapping information may be updated. The user device may update the mapping information. The user device may update the mapping information to remove network devices from the mapping information that are not within the communication range. The user device, based on updated mapping information, may execute operations using less energy and computational resources than would normally be required, based on a reduced amount to data/information to process. The user device may execute geolocation operations to determine a location of the user device based on the one or more network devices, such as network sniffer and wireless positioning operations, RSSI signal measurements and location approximation operations, and time of arrival operations based on information transmitted by the one or more network devices.

At 940 the user device may communicate with the one or more network device within the communication range to determine network information. The user device may determine the location of the user device based on network information received from and/or associated with the one or more network devices within the communication range. The network information may include signals, beacons, received signal strength indication (RSSI), data transmissions, and the like associated with each network device of the one or more network devices within the communication range. The user device may conserve energy and data/information processing resources by receiving and using the mapping information to determine the location of the user device without transmitting information/data to the one or more network devices within the communication range. The user device may use wireless (e.g., Wi-Fi, etc.) positioning, based on the one or more network devices and the network information, to determine a location of the user device. The user device may extract a data packet from the network information. The user device may determine a data rate of the data packet. The user device may analyze the data rate in accordance with a location, identified by the mapping information, of a network device of the one or more network devices within the communication range. The user device may determine, based on the data rate of the data packet and the location of the network (that sent the packet), an approximate location of the user device. The user device may execute similar analysis based on a data packet received from each network device of the one or more network devices within the communication range, and combine the analysis results to improve accuracy of the determined location of the user device. The user device may use the mapping information and/or network information to determine a location of the user device by any method.

Content may be sent to the one or more network devices within the communication range of the user device. The user device may send (e.g., via unicast, multicast, etc.) content to the one or more network devices within the communication range of the user device. The user device may send content that includes global positioning information to and/or receive content that includes global positioning information from the one or more network devices to determine a location (e.g., geolocation, etc.) of the user device. The user device may send the one or more network devices any content (e.g., information, data, etc.) that may be used to determine a location of the user device.

Figure 10:
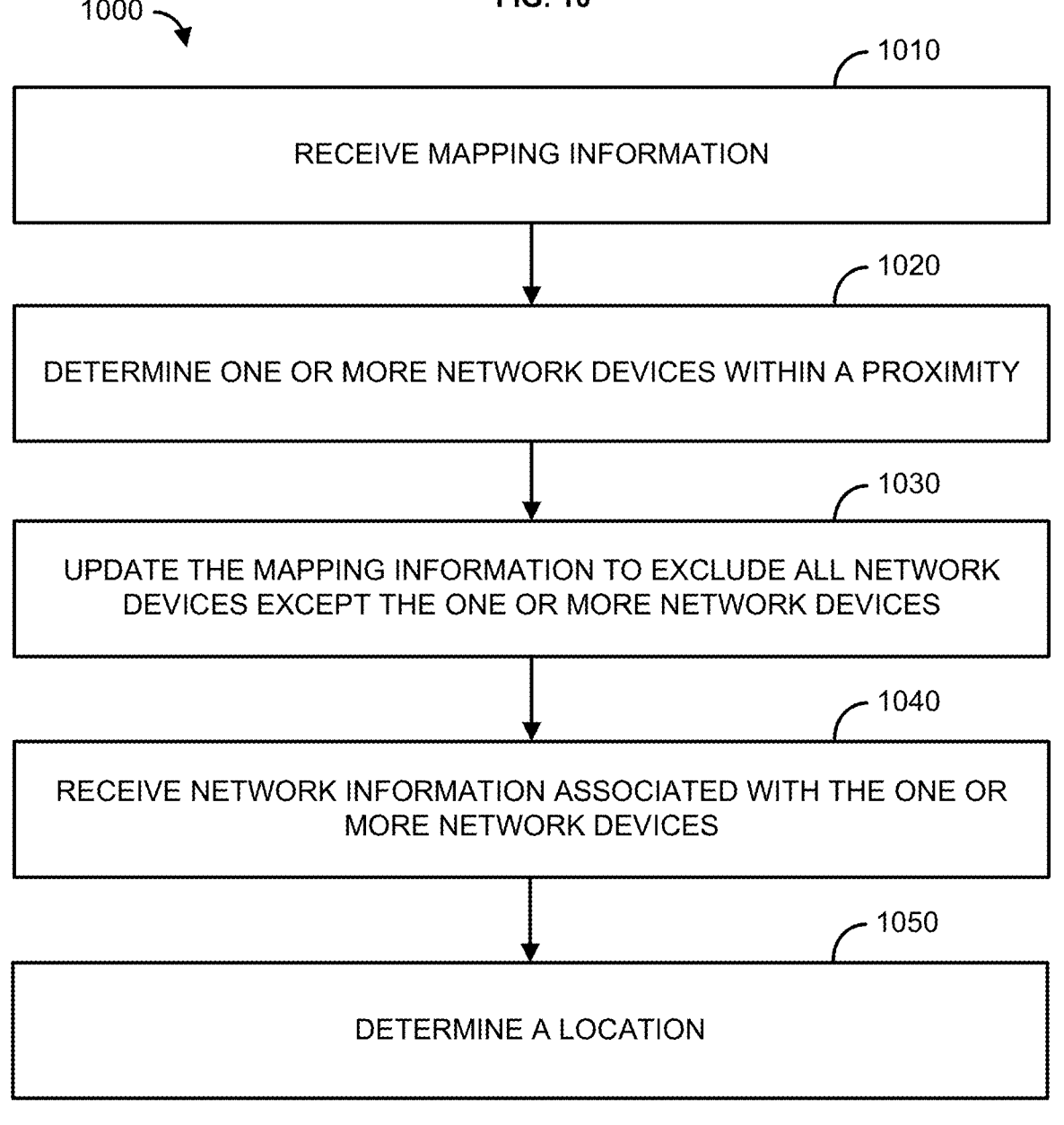
FIG. 10 shows a flowchart of a method for localized geolocation.

FIG. 10 shows a flowchart of a method 1000 for localized geolocation. At 1010, mapping information may be received. A user device (e.g., a data collection device, an Internet of Things (IoT) device, an end device, a low-power device, a sensor, etc.) may receive mapping information. The mapping information may include a respective location of each network device (e.g., access point, router, long-range (LoRa) access point, edge device, etc.) of a plurality of network devices within a geographical area. The geographical area may be relative to the user device, such as within a proximity of the user device. The geographical area may be a building, a neighborhood, a city, and/or the like. The geographical area may be an area of any size. A user device located on Market Street in Philadelphia, Pennsylvania may receive mapping information that includes location information for each network device within a 50 mile radius (or any distance radius) from the user device location on Market Street.

The user device may receive the mapping information from a gateway device (e.g., the computing device 104, a long-range (LoRa) device, a computing device, a cloud device, etc.). The user device may receive the mapping information from the gateway device without requesting the mapping information. The user device may receive the mapping information from the gateway device based on a periodic broadcast/transmission by the gateway device. The gateway device may transmit and/or broadcast a beacon, or any other signal that has and/or is associated with the mapping information.

The user device may receive the mapping information from the computing device based on a request for the mapping information. The user device may receive the mapping information from any device or based on any communication technique. The gateway device may send (e.g., provide, distribute, etc.) the mapping information to the user device using any suitable wireless protocol, such as Wi-Fi (IEEE 802.11), BLUETOOTH®, cellular, satellite, infrared, or any other suitable wireless standard. The gateway device may send (e.g., provide, distribute, etc.) the mapping information to the user device via a short-range communication technique (e.g., BLUETOOTH®, near-field communication, infrared, and the like). The gateway device may send (e.g., provide, distribute, etc.) the mapping information to the user device via a long-range communication technique (e.g., Internet, cellular, satellite, and the like). The gateway device may send (e.g., provide, distribute, etc.) the mapping information to the user device via any suitable method, including any wireless communication technique and/or any wired communication technique.

At 1020, one or more network devices of the plurality of network devices within a proximity of the user device may be determined. The user device may determine one or more network devices of the plurality of network devices within a proximity of the user device. The user device may determine the one or more network devices based on a capability of the user device and the respective location of each network device of the plurality of network devices identified by the mapping information. The capability of the user device may include a communication range of the user device. The one or more network devices of the plurality of network devices within the proximity of the user device may be network devices within the communication range. The user device may determine one or more network devices of a plurality of network devices within a proximity of the user device based on any suitable method.

At 1030, the mapping information may be updated. The user device may update the mapping information. The user device may update the mapping information to remove network devices from the mapping information that are not within the communication range. The user device, based on updated mapping information, may execute operations using less energy and computational resources than would normally be required, based on a reduced amount to data/information to process.

At 1040, network information may be received. The user device may receive network information (e.g., beacons, received signal strength indication (RSSI), data transmissions, etc.) from each network device of the one or more network devices within the communication range of the user device. The user device may receive the network information from the one or more network devices without requesting the network information, such as by sniffing/intercepting the network information.

At 1050, a location of the user device may be determined. The user device may determine a location of the user device based on the network information. The user device may conserve energy and data/information processing resources by receiving and using the mapping information for geolocation without transmitting information/data, such as to a network device and/or the gateway device.

The user device may use wireless (e.g., Wi-Fi, etc.) positioning, based on the one or more network devices and the network information, to determine a location of the user device. The user device may extract a data packet from the network information. The user device may determine a data rate of the data packet. The user device may analyze the data rate in accordance with a location, identified by the mapping information, of a network device of the one or more network devices within the communication range. The user device may determine, based on the data rate of the data packet and the location of the network (that sent the packet), an approximate location of the user device. The user device may execute similar analysis based on a data packet received from each network device of the one or more network devices within the communication range, and combine the analysis results to improve accuracy of the determined location of the user device. The user device may use the mapping information and/or network information to determine a location of the user device by any method.

Figure 11:
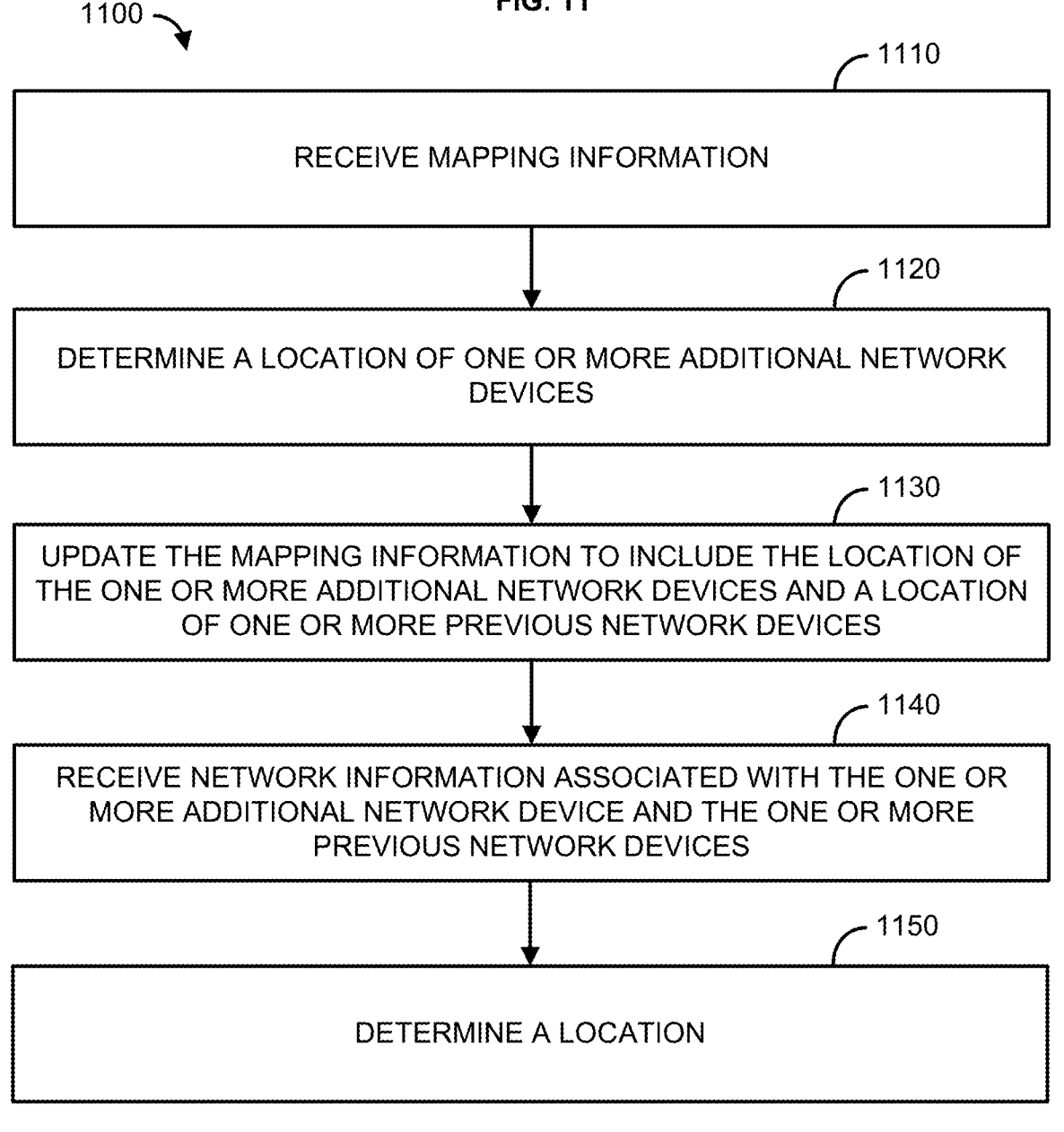
FIG. 11 shows a flowchart of a method for localized geolocation.

FIG. 11 shows a flowchart of a method 1100 for localized geolocation. At 1110, mapping information may be received. A user device (e.g., a data collection device, an Internet of Things (IoT) device, an end device, a low-power device, a sensor, etc.) may receive mapping information. The mapping information may include a respective location of each network device (e.g., access point, router, long-range (LoRa) access point, edge device, etc.) of a plurality of network devices within a geographical area. The geographical area may be relative to the user device, such as within a proximity of the user device. The geographical area may be a building, a neighborhood, a city, and/or the like. The geographical area may be an area of any size. A user device located on Market Street in Philadelphia, Pennsylvania may receive mapping information that includes location information for each network device within a 50 mile radius (or any distance radius) from the user device location on Market Street.

The user device may receive the mapping information from a gateway device (e.g., the computing device 104, a long-range (LoRa) device, a computing device, a cloud device, etc.). The user device may receive the mapping information from the gateway device without requesting the mapping information. The user device may receive the mapping information from the gateway device based on a periodic broadcast/transmission by the gateway device. The gateway device may transmit and/or broadcast a beacon, or any other signal that has and/or is associated with the mapping information.

The user device may receive the mapping information from the computing device based on a request for the mapping information. The user device may receive the mapping information from any device or based on any communication technique. The gateway device may send (e.g., provide, distribute, etc.) the mapping information to the user device using any suitable wireless protocol, such as Wi-Fi (IEEE 802.11), BLUETOOTH®, cellular, satellite, infrared, or any other suitable wireless standard. The gateway device may send (e.g., provide, distribute, etc.) the mapping information to the user device via a short-range communication technique (e.g., BLUETOOTH®, near-field communication, infrared, and the like). The gateway device may send (e.g., provide, distribute, etc.) the mapping information to the user device via a long-range communication technique (e.g., Internet, cellular, satellite, and the like). The gateway device may send (e.g., provide, distribute, etc.) the mapping information to the user device via any suitable method, including any wireless communication technique and/or any wired communication technique.

At 1120, a determination may be made that the mapping information has one or more additional network devices than a quantity of network devices included with previous mapping information. The user device may determine that the mapping information has one or more additional network devices than a quantity of network devices included with previous mapping information. The user device may receive the previous mapping information, based on the same method described for the mapping information, before receiving the mapping information. The user device may compare locations of network devices identified by the mapping information to locations of network devices identified by the previous mapping information and determine that the mapping information includes the one or more additional network devices.

At 1130, mapping information may be updated. The user device may update the mapping information and/or the previous mapping information based on a capability of the user device and the additional network devices. The capability of the user device may be based on a communication range of the user device. The user device may update the previous mapping information to exclude network devices that may no longer be within a communication range of the user device. When the location of the user device is dynamic, such as a user device in a moving vehicle, locations of one or more network devices included with previous mapping information may no longer be within a communication range of the user device. The user device may update the previous mapping information to include locations of the additional network devices. The user device may update the mapping information in a similar or the same method described for updating the previous mapping information. The user device, based on updated mapping information and/or previous mapping information, may execute operations using less energy and computational resources than would normally be required, based on a reduced amount to data/information to process.

At 1140, network information may be received. The user device may receive network information (e.g., beacons, received signal strength indication (RSSI), data transmissions, etc.) from each network device identified by the mapping information and/or the previous mapping information. The user device may receive the network information from the network devices without requesting the network information, such as by sniffing/intercepting the network information.

At 1150, a location of the user device may be determined. The user device may determine a location of the user device based on the network information. The user device may conserve energy and data/information processing resources by receiving and using the mapping information for geolocation without transmitting information/data, such as to a network device and/or the gateway device.

The user device may use wireless (e.g., Wi-Fi, etc.) positioning, based on the network devices identified by the mapping information, the previous mapping information, and/or updated mapping information to determine a location of the user device. The user device may extract a data packet from the network information. The user device may determine a data rate of the data packet. The user device may analyze the data rate in accordance with a location, identified by the mapping information, the previous mapping information, and/or updated mapping information, of a network device within the communication range. The user device may determine, based on the data rate of the data packet and the location of the network (that sent the packet), an approximate location of the user device. The user device may execute similar analysis based on a data packet received from each network device within the communication range, and combine the analysis results to improve accuracy of the determined location of the user device. The user device may use the mapping information, the previous mapping information, updated mapping information, and/or network information to determine a location of the user device by any method.

Figure 12:
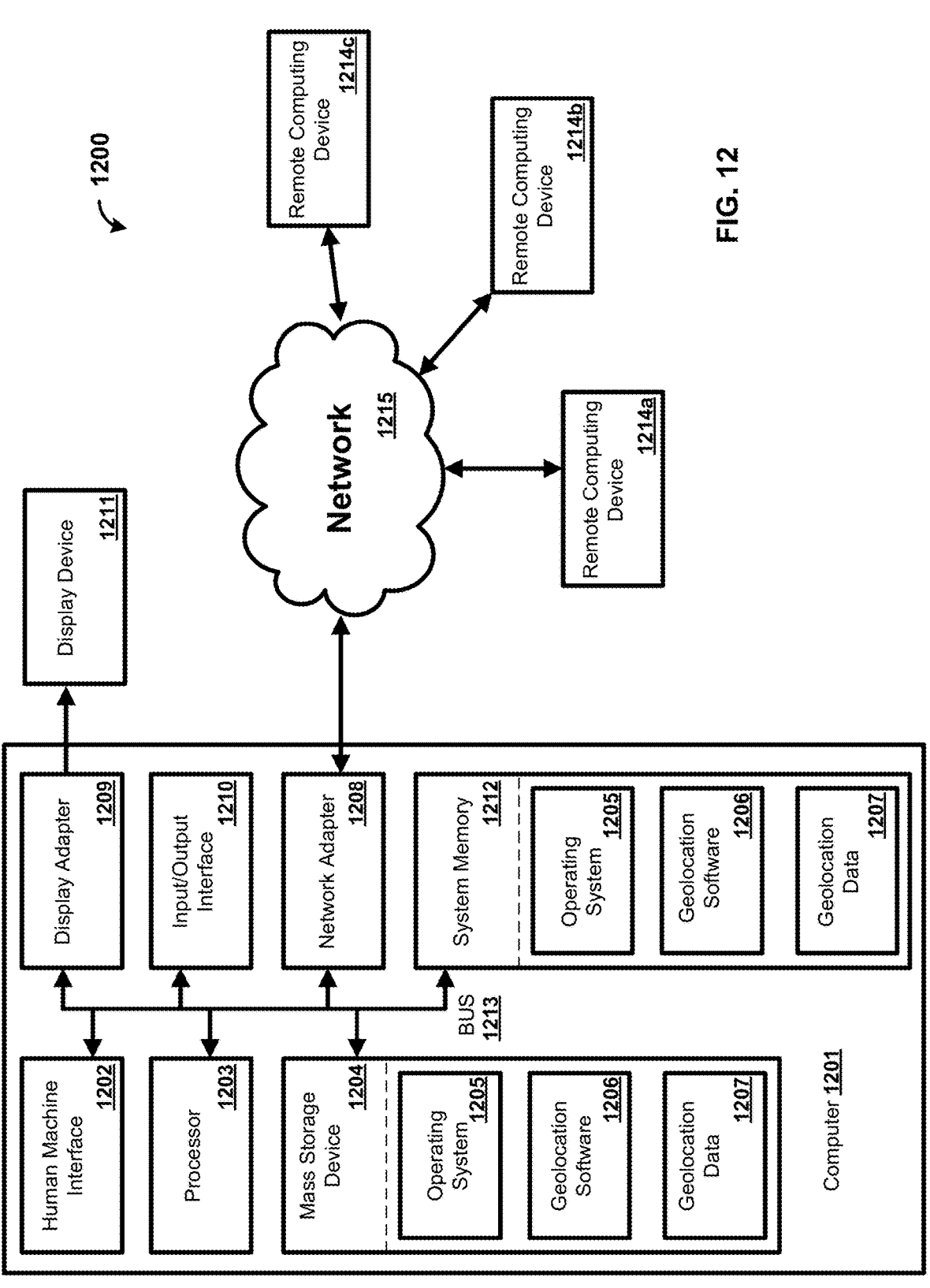
FIG. 12 shows a block diagram of a computing device for implementing localized geolocation.

FIG. 12 shows a system 1200 for localized geolocation. The user device 102, the computing device 104, the network device 116, and the network device 117 of FIG. 1 and/or any device described herein may be a computer 1201 as shown in FIG. 12. The computer 1201 may comprise one or more processors 1203, a system memory 1212, and a bus 1213 that couples various components of the computer 1201 including the one or more processors 1203 to the system memory 1212. In the case of multiple processors 1203, the computer 1201 may utilize parallel computing.

The bus 1213 may comprise one or more of several possible types of bus structures, such as a memory bus, memory controller, a peripheral bus, an accelerated graphics port, and a processor or local bus using any of a variety of bus architectures.

The computer 1201 may operate on and/or comprise a variety of computer readable media (e.g., non-transitory). Computer readable media may be any available media that is accessible by the computer 1201 and comprises, non-transitory, volatile and/or non-volatile media, removable and non-removable media. The system memory 1212 has computer readable media in the form of volatile memory, such as random access memory (RAM), and/or non-volatile memory, such as read only memory (ROM). The system memory 1212 may store data such as geolocation data 1207 and/or program modules such as operating system 1205 and geolocation software 1206 that are accessible to and/or are operated on by the one or more processors 1203.

The computer 1201 may also comprise other removable/non-removable, volatile/non-volatile computer storage media. The mass storage device 1204 may provide non-volatile storage of computer code, computer readable instructions, data structures, program modules, and other data for the computer 1201. The mass storage device 1204 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1204. An operating system 1205 and geolocation software 1206 may be stored on the mass storage device 1204. One or more of the operating system 1205 and geolocation software 1206 (or some combination thereof) may comprise program modules and the geolocation software 1206. Geolocation data 1207 may also be stored on the mass storage device 1204. Geolocation data 1207 may be stored in any of one or more databases known in the art. The databases may be centralized or distributed across multiple locations within the network 1215.

A user may enter commands and information into the computer 1201 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 1203 via a human machine interface 1202 that is coupled to the bus 1213, but may be connected by other interface and bus structures, such as a parallel port, game port, an IEEE 1394 Port (also known as a Firewire port), a serial port, network adapter 1208, and/or a universal serial bus (USB).

A display device 1211 may also be connected to the bus 1213 via an interface, such as a display adapter 1209. It is contemplated that the computer 1201 may have more than one display adapter 1209 and the computer 1201 may have more than one display device 1211. A display device 1211 may be a monitor, an LCD (Liquid Crystal Display), light emitting diode (LED) display, television, smart lens, smart glass, and/or a projector. In addition to the display device 1211, other output peripheral devices may comprise components such as speakers (not shown) and a printer (not shown) which may be connected to the computer 1201 via Input/Output Interface 1210. Any step and/or result of the methods may be output (or caused to be output) in any form to an output device. Such output may be any form of visual representation, including, but not limited to, textual, graphical, animation, audio, tactile, and the like. The display 1211 and computer 1201 may be part of one device, or separate devices.

The computer 1201 may operate in a networked environment using logical connections to one or more remote computing devices 1214*a,b,c*. A remote computing device 1214*a,b,c* may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 1201 and a remote computing device 1214*a,b,c* may be made via a network 1215, such as a local area network (LAN) and/or a general wide area network (WAN). Such network connections may be through a network adapter 1208. A network adapter 1208 may be implemented in both wired and wireless environments. Such networking environments are conventional and commonplace in dwellings, offices, enterprise-wide computer networks, intranets, and the Internet.

Application programs and other executable program components such as the operating system 1205 are shown herein as discrete blocks, although it is recognized that such programs and components may reside at various times in different storage components of the computing device 1201, and are executed by the one or more processors 1203 of the computer 1201. An implementation of geolocation software 1206 may be stored on or sent across some form of computer readable media. Any of the disclosed methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
receiving, by a device, locations of a plurality of network devices;
determining the plurality of network devices comprises an additional network device not included in prior mapping information comprising locations of a second plurality of network devices;
generating current mapping information comprising at least the portion of the plurality of network devices comprising the additional network device; and
sending, based on the current mapping information, to at least a portion of the plurality of network devices comprising the additional network device, a signal.

2. The method of claim 1, wherein determining the plurality of network devices comprises the additional network device comprises:
comparing the locations of the plurality of network devices to the prior mapping information comprising the locations of the second plurality of network devices; and
determining, based on the comparison, the locations of the plurality of network devices comprises the additional network device not included in the prior mapping information comprising the locations of the second plurality of network devices.

3. The method of claim 1, wherein the current mapping information comprises locations of fewer network devices than the prior mapping information.

4. The method of claim 1, further comprising determining the additional network device is within communication range of the device, wherein sending, to the at least the portion of the plurality of network devices comprising the additional network device, the signal is further based on the additional network device being within communication range of the device.

5. The method of claim 1, further comprising sending, to a gateway device, a request for the locations of the plurality of network devices.

6. The method of claim 1, wherein the device comprises an Internet of Things (IoT) device.

7. The method of claim 1, further comprising:

determining a signal strength associated with the additional network device; and determining the signal strength satisfies a signal strength threshold, wherein sending, to the at least the portion of the plurality of network devices comprising the additional network device, the signal is further based on the signal strength satisfying the signal strength threshold.

8. A method comprising:

receiving, by a device, mapping information comprising locations of a plurality of network devices;

sending, to the plurality of network devices, a first signal;

determining, based on a plurality of signal strengths, a plurality of included network devices of the plurality of network devices and at least one excluded network device of the plurality of network devices;

creating, based on a signal strength for the at least one excluded network device, second mapping information comprising locations of a revised plurality of network devices comprising the plurality of included network devices; and sending, to the revised plurality of network devices a second signal.

9. The method of claim 8, wherein the device comprises an Internet of Things (IoT) device.

10. The method of claim 8, wherein the revised plurality of network devices does not include the at least one excluded network device.

11. The method of claim 8, wherein an amount of energy for the device to send the second signal is less than an amount of energy for the device to send the first signal.

12. The method of claim 8, wherein determining the at least one excluded network device comprises determining that a respective signal strength of the plurality of signal strengths associated with each excluded network device of the at least one excluded network device does not satisfy a signal strength threshold.

13. The method of claim 8, further comprising:

receiving, by the device and from the revised plurality of network devices, network information; and determining, based on the network information, a location of the device.

14. The method of claim 8, further comprising receiving, by the device and from the plurality of network devices, network information, wherein the network information comprises a respective received signal strength indication (RSSI) for each network device of the plurality of network devices and wherein the plurality of signal strengths are based on the respective RSSI for each network device of the plurality of network devices.

15. A method comprising:

determining, by a device, mapping information comprising a plurality of network devices;

detecting, by the device, a respective signal from each network device of the plurality of network devices, wherein the respective signal comprises a signal strength; and creating, by the device and based on the respective signal strength, second mapping information comprising less than all of the plurality of network devices.

16. The method of claim 15, further comprising sending, by the device and to the less than all of the plurality of network devices from the second mapping information, a signal.

17. The method of claim 15, wherein the device comprises an Internet of Things (IoT) device.

18. The method of claim 15, wherein the device comprises at least one of: a low power device or a sensor.

19. The method of claim 15, further comprising:

sending, by the device and to the plurality of network devices, a first signal; and sending, by the device and to the less than all of the plurality of network devices, a second signal, wherein an amount of energy for the device to send the second signal is less than an amount of energy for the device to send the first signal.

20. The method of claim 15, wherein determining the mapping information comprises:

sending, to a gateway device, a request for the mapping information; and receiving, from the gateway device, the mapping information.

* * * * *